(12) United States Patent
Murphy

(10) Patent No.: US 10,795,553 B2
(45) Date of Patent: *Oct. 6, 2020

(54) SYSTEMS AND METHODS FOR INTELLIGENT LAYERED INTERACTIVE PROGRAMMATIC ELEMENTS FOR FIXED CONTENT

(71) Applicant: Michael E. Murphy, Dublin (IE)

(72) Inventor: Michael E. Murphy, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,968

(22) Filed: May 30, 2019

(65) Prior Publication Data

US 2019/0278449 A1 Sep. 12, 2019

Related U.S. Application Data

(63) Continuation of application No. 15/873,905, filed on Jan. 18, 2018, now Pat. No. 10,346,004.

(60) Provisional application No. 62/447,459, filed on Jan. 18, 2017.

(51) Int. Cl.
*G06F 3/0484* (2013.01)
*G06F 3/0481* (2013.01)
*G06F 9/451* (2018.01)

(52) U.S. Cl.
CPC .......... *G06F 3/0484* (2013.01); *G06F 3/0481* (2013.01); *G06F 9/451* (2018.02); *G09G 2340/0464* (2013.01); *G09G 2354/00* (2013.01)

(58) Field of Classification Search
CPC ...... G06F 3/0484; G06F 3/0481; G06F 9/451; G09G 2340/0464; G09G 2354/00
See application file for complete search history.

(56) References Cited

U.S. PATENT DOCUMENTS

| | | | | |
|---|---|---|---|---|
| 2003/0164859 A1* | 9/2003 | Evans | ................... | G06F 3/0481 715/792 |
| 2007/0089053 A1* | 4/2007 | Uhlig | ................... | G06F 17/212 715/255 |
| 2007/0296718 A1* | 12/2007 | Tzruya | ................... | G06Q 30/02 345/418 |

(Continued)

*Primary Examiner* — Michael Pervan
(74) *Attorney, Agent, or Firm* — Marin Patents LP; Gustavo Marin

(57) ABSTRACT

The disclosed systems and methods relate to the creation and use of fixed-layout display component(s) embedded as part of the overall programmatic device(s) screen display(s). In preferred embodiments, these fixed-layout components may behave in a specific manner and can be utilized and managed independently of the remaining programmatically generated screen display functionality. A fixed-layout component may contain many elements and associated user interactivities. Each element may be related positionally, dimensionally and display sequence to the overall component and to other elements contained such that the mathematical calculation of relative position, size and dimension aspect ratio of all the component items and the item display sequence is maintained programmatically and visually relative to each other irrespective of the device screen size or orientation when the fixed-layout component is part of an overall display. Advantages include rapid embedding of fixed-layout component(s) into device(s) display application(s).

16 Claims, 28 Drawing Sheets

(56) References Cited

U.S. PATENT DOCUMENTS

| | | | |
|---|---|---|---|
| 2014/0258847 A1* | 9/2014 | Cleave | G06F 16/957 715/235 |
| 2015/0254530 A1* | 9/2015 | Gulwani | G06F 16/84 382/187 |
| 2015/0363909 A1* | 12/2015 | Cudak | G06T 3/40 345/428 |
| 2017/0270848 A1* | 9/2017 | Liu | G06F 3/04842 |
| 2017/0329483 A1* | 11/2017 | Jann | G06F 3/04845 |
| 2018/0143842 A1* | 5/2018 | Weiss | G09G 5/38 |

* cited by examiner

SYSTEMS AND METHODS FOR INTELLIGENT LAYERED INTERACTIVE PROGRAMMATIC ELEMENTS FOR FIXED CONTENT

CROSS-REFERENCE TO RELATED APPLICATIONS

This application claims the benefit of, and priority to, U.S. patent application Ser. No. 15/873,905 filed on Jan. 18, 2018 entitled "SYSTEMS AND METHODS FOR INTELLIGENT LAYERED INTERACTIVE PROGRAMMATIC ELEMENTS FOR FIXED CONTENT," which claims the benefit of, and priority to, provisional application Ser. No. 62/447,459 filed on Jan. 18, 2017, the entire specifications of which are incorporated herein by reference.

BACKGROUND OF THE INVENTION

Field of the Art

The disclosure relates to the field of systems interactivity, and more particularly to the field enabling fixed-layout content to receive input and communication with interactive systems.

Discussion of the State of the Art

Content (text, graphics, photos, images, and/or any combination of these) may be developed in a wide variety of content or general authoring applications at present. This content can then be printed or exported out to a variety of formats depending on the feature/functions of the original source content or authoring user application. This content, which is already authored and available may be required, specifically in business environments, to be re-used in other application software systems or servers comprising database(s), file storage systems, workflow and other logic operations. Various methods may be available to export out this content from these authoring applications so that it can be re-used in some way for these other purposes. The content export approach from these source/authoring applications may be dependent on the available functions within these source application which create, and is often typically via an option (a) comprising all the elements at their lowest level (text, graphics, photos, images, etc.) or via an option (b) comprising an overall graphic image (i.e. snapshot) which preserves the original content layout exactly as it would be presented visually to an end user in an associated original source application, via some combination of Option (a) and (b), or via some other processes. If option (a) is available, it may require additional manual efforts to extract and then condition and clean the content so that it is re-useable in the mentioned systems, whereby these manual efforts will result in additional time and associated cost. If option (b) is used, this will result in fixed-layout content image(s) being exported, and if the user then wishes to extract out some or all of the elements (text, graphics, photos, images, etc.), they may need further additional content extraction tools, e.g. optical character recognition (OCR), combined with a plurality of manual efforts to extract and clean the elements for re-use, which results in incurring significantly more time and cost as compared to option (a). Any further combinations of options (a) and (b), or other derivative methods, will also all drive additional time effort and cost to complete. Manual time effort and cost problem can become a very large problem if the volume of content is high. It is typical for business enterprises to have tens of thousands, if not millions, of pages of content where there is a pressing requirement to re-use this content in application software and server systems with databases, file systems, workflow management systems, and/or other logic systems as outlined previously, which amplifies the problem. Typically replacing this content into an interactive form requires an unreasonable amount of time and cost, and in some cases, there are mandatory requirements to exactly preserve the original content layout precisely (i.e. precise fixed-layout content). Accordingly, many business enterprises choose option (b) described above, incurring additional time and huge costs to complete. Fixed-layout content is defined as being a precise and accurate (for example, pixel by pixel, or using an alternative unit of measure) representing the original source authored content.

All of the above methods are focused on exporting or extracting and or conditioning content for further re-use, and combining this with logic to arrive at new systems and server applications, and to deliver new user experiences for the end user. Accordingly, content extraction, conditioning, and re-use methods, known in the art, incur time and cost to complete. Further, some options outlined above provide less flexibility for content re-use than others in the creation of new application processes and systems and servers.

What is needed are systems and methods to easily extract and combine extracted content with programmatic elements to programmatic systems and servers in a way that: (a) significantly reduces time (including manual additional processes) and associated cost for extraction and conditioning of content; (b) allows for original source content to be combined easily with programmatic element systems and servers; (c) allows separated control and behavior of the extracted content compared to programmatic elements; (d) allows for easy association of programmatic elements to extracted content; and, (e) supports size scaling of extracted content such that all associated programmatic elements automatically and dynamically re-size/re-scale relative to other programmatic elements within the extracted content while acting independently of programmatic system and servers.

SUMMARY OF THE INVENTION

Accordingly, the inventor has conceived and reduced to practice, in various embodiment of the invention, systems and methods to programmatically generate and managing embedded fixed-layout component(s), and direct associated items or user interactivities into a display component of a computer system user interface, that may behave independently of other programmatically generated display components. A preferred embodiment of the invention relates to the use of taking fixed-layout content as discussed in the background to enable re-usable content with significantly greater user functionality and reduced time and associated cost to prepare. Interaction may be received from a user device though various elements and associated interactivities that may be configured as part of these specific component(s). A network-connected component layout computer comprising a processor, a database, a memory, and programming instructions stored in the memory, the programming instructions, when executed by the processor may dynamically generate and manage a plurality of fixed-layout components that may be part of a computer system interface whereby the interface may behave in a seamless manner when displayed to a user. That is, a user may not notice a difference between fixed and programmatic components. The plurality of fixed-layout components may be independent and may behave independently of the other programmatic elements of computer systems across a range of devices, display sizes, display orientations, and/or underlying system operating system.

In some embodiments, one or more fixed-layout components may be integrated within online or native installed user device applications executing on a display of a computing system. In some embodiments, there may be many fixed-layout content components embedded in the overall user interface display.

The one or more fixed-layout components, and direct associated items may be linked to each other (within the component) via associated dimensions and positional data, and may be collectively referred to hereinafter as "component".

In some embodiments, one or more fixed-layout components and direct associated elements may proportionally re-scale, in size, exactly and relative to each other, depending on the screen size of a user interface display of a target computer device; and may be independent of other re-scaling and re-alignments performed by remaining elements of the user interface.

An embedding approach for fixed-layout components and direct associated items may provide an additional method of building a component of a computer system user interface that may be then seamlessly embedded into an overall programmatic derived user interface display. This fixed-layout component inclusion in a user interface provides an alternative and fast method to having to programmatically recreate content elements in a manner (for example, from digital print media) that may exactly replicate, including aspect ratio, positional data, original content item, and which may behave independently of the programmatic display for a user device or orientation. Direct associated elements may then be directly linked to this fixed-layout component for additional user visual presentation and additional interactions received from user devices. In some embodiments, direct associated elements may also support interactions received from a user device with an ability to receive user-entered data that may then be re-associated with the one or more fixed-layout components.

In some embodiments, the user interface comprising the fixed-layout component and the direct associated elements may be displayed on a computing device for example, via an online application or a native device installed application, and an associated one or more fixed-layout components and associated elements may present in the same proportion, position, dimension, relative dimension, and independently of properties (size, display, orientation, etc.) of the user device.

Exemplary embodiments of the systems and methods described herein comprise generation of one or more fixed-layout components, assemblage, and usage of the components while providing reliance on positional and dimensional (and other data types) for at least a portion of the items contained within each fixed-layout component.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

Figure 10A:
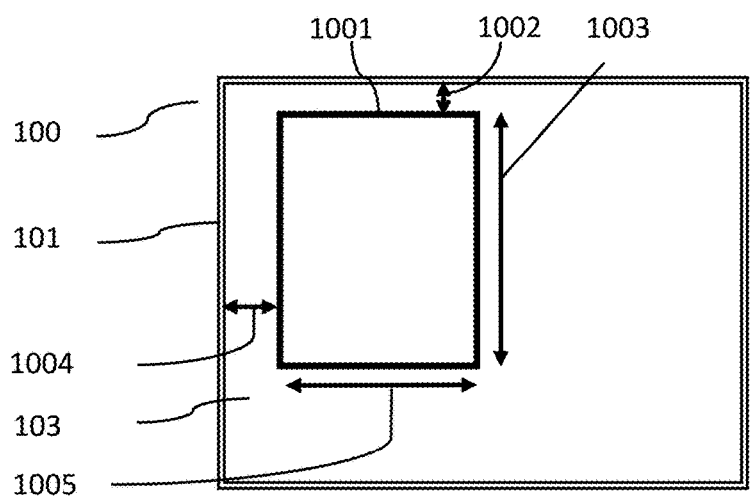
Figure 10B:
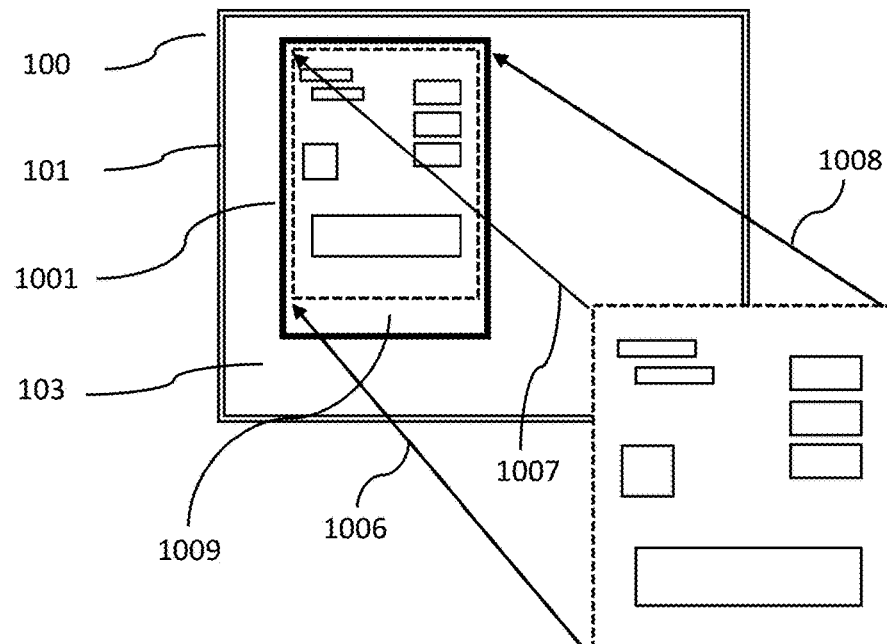
Figure 10C:
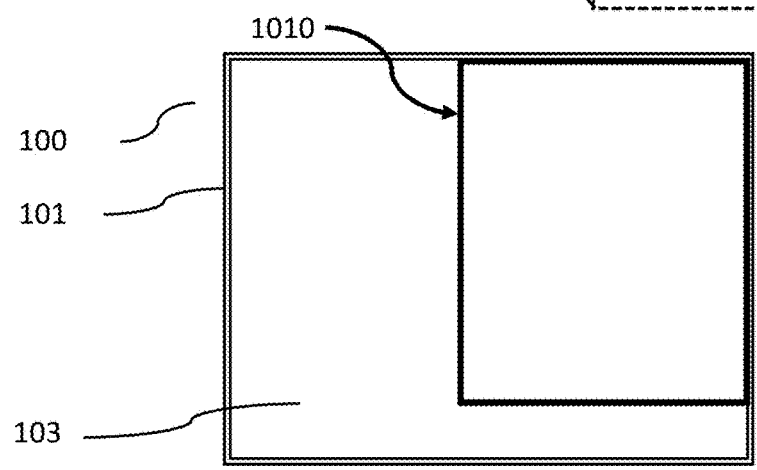
Figure 11:
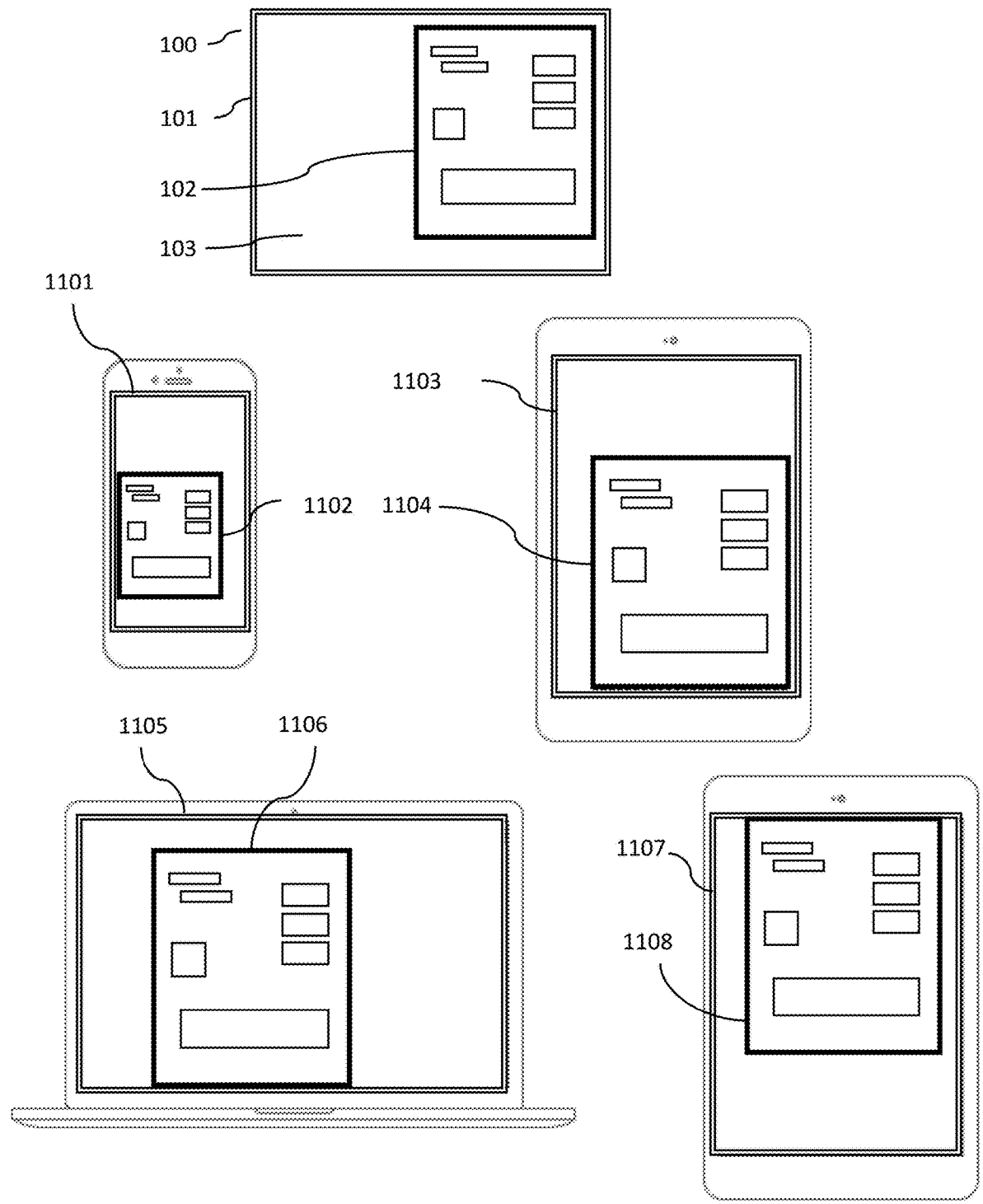
Figure 12:
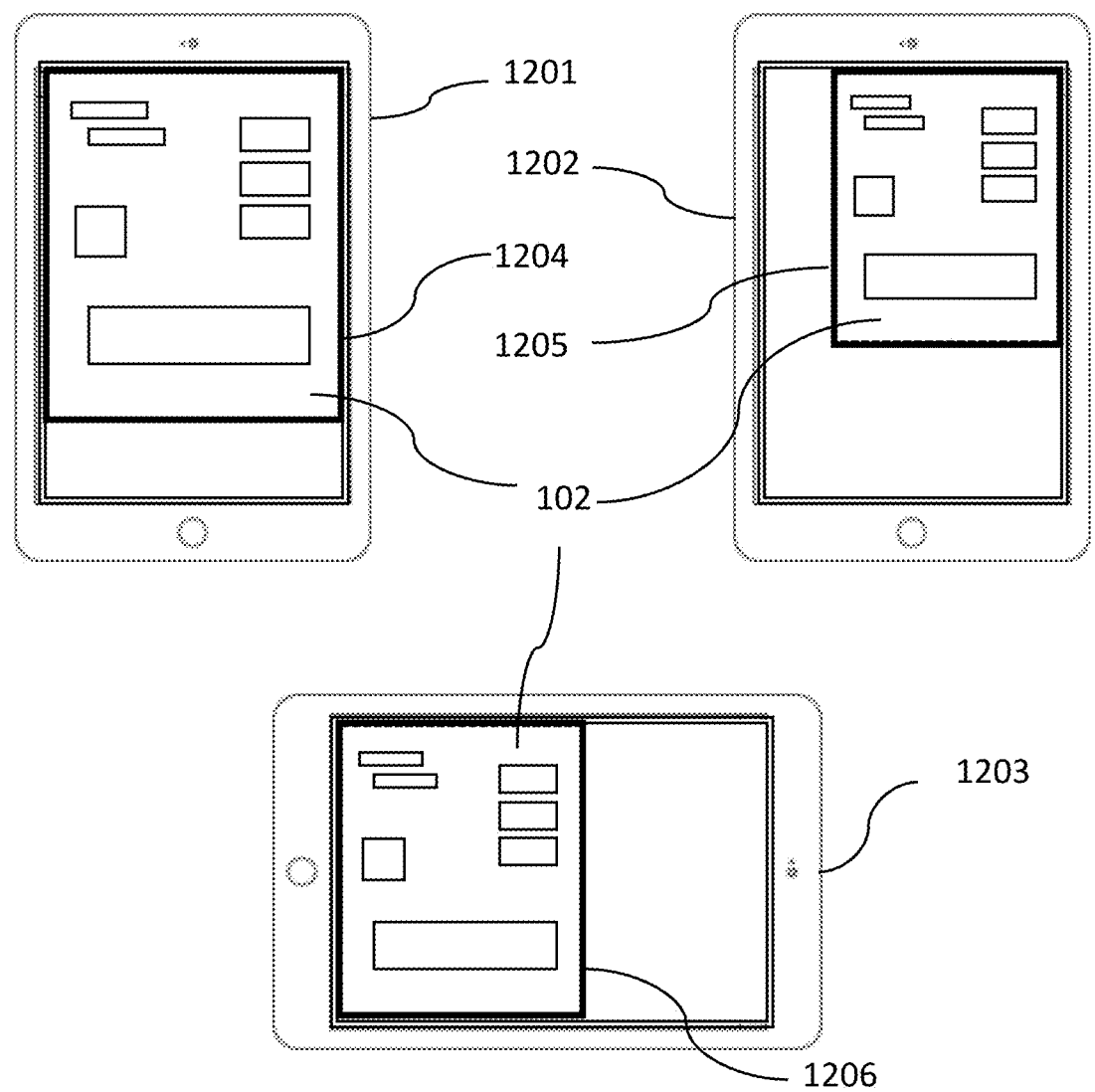
Figure 13:
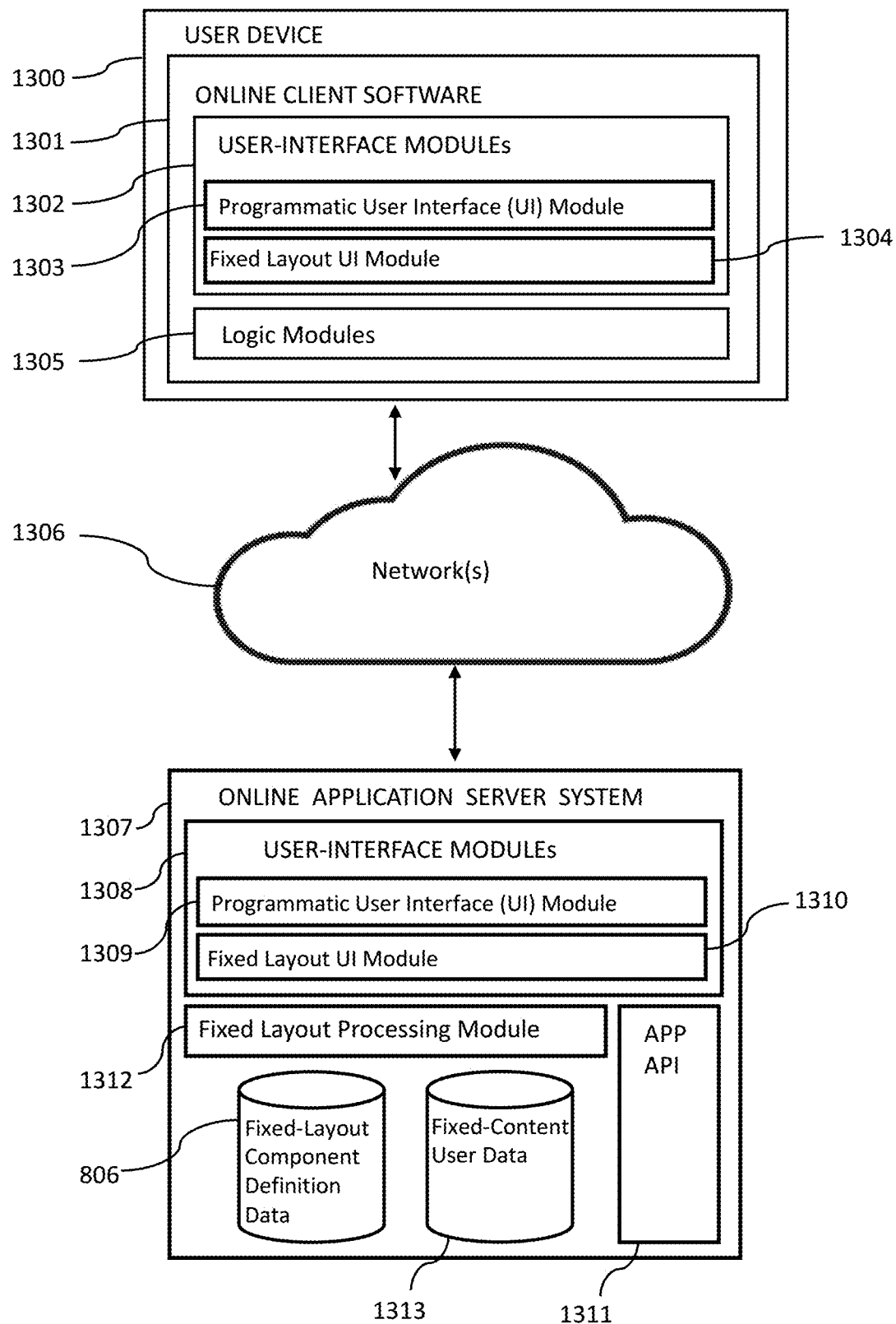
Figure 14:
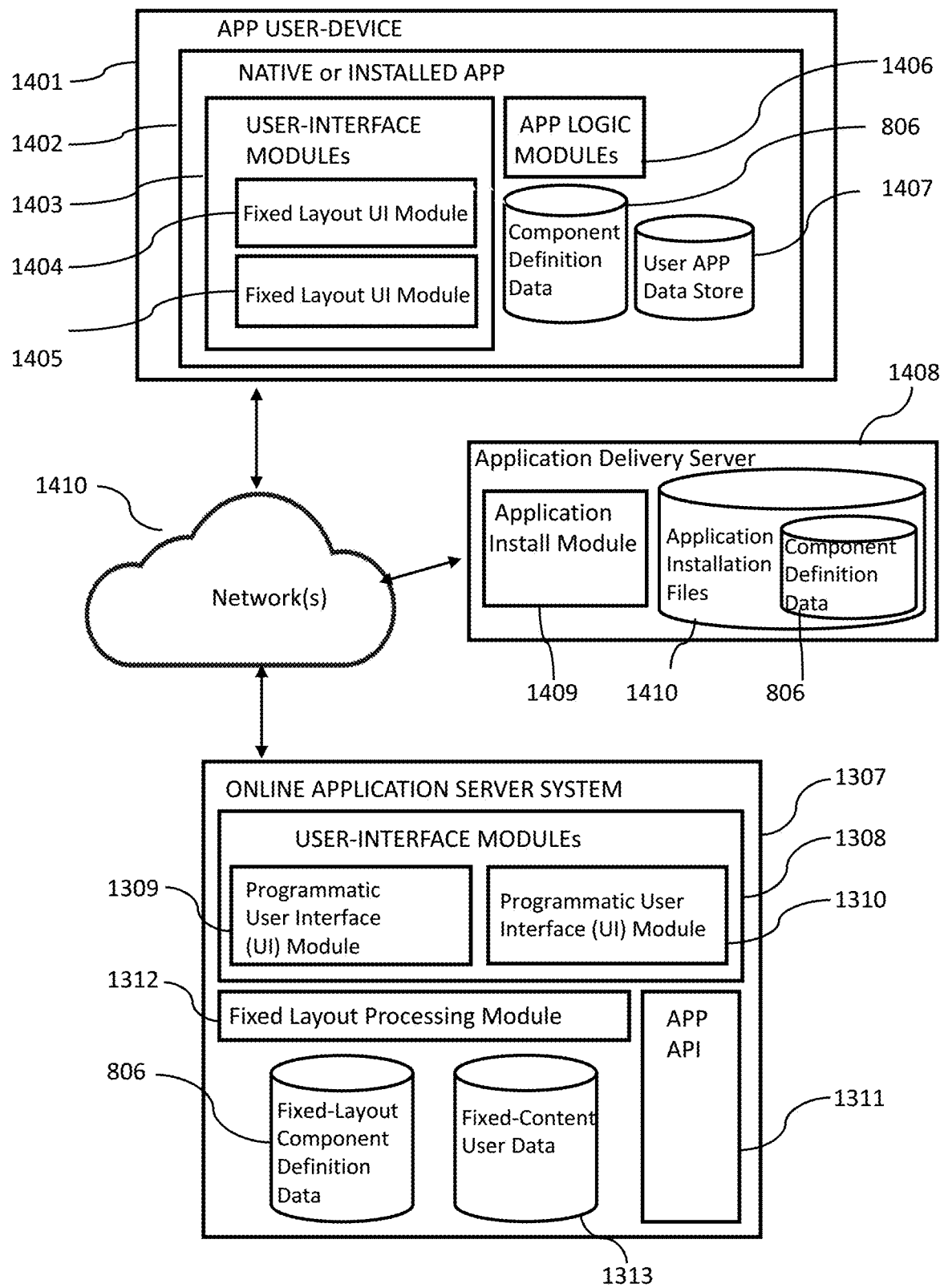
Figure 15:
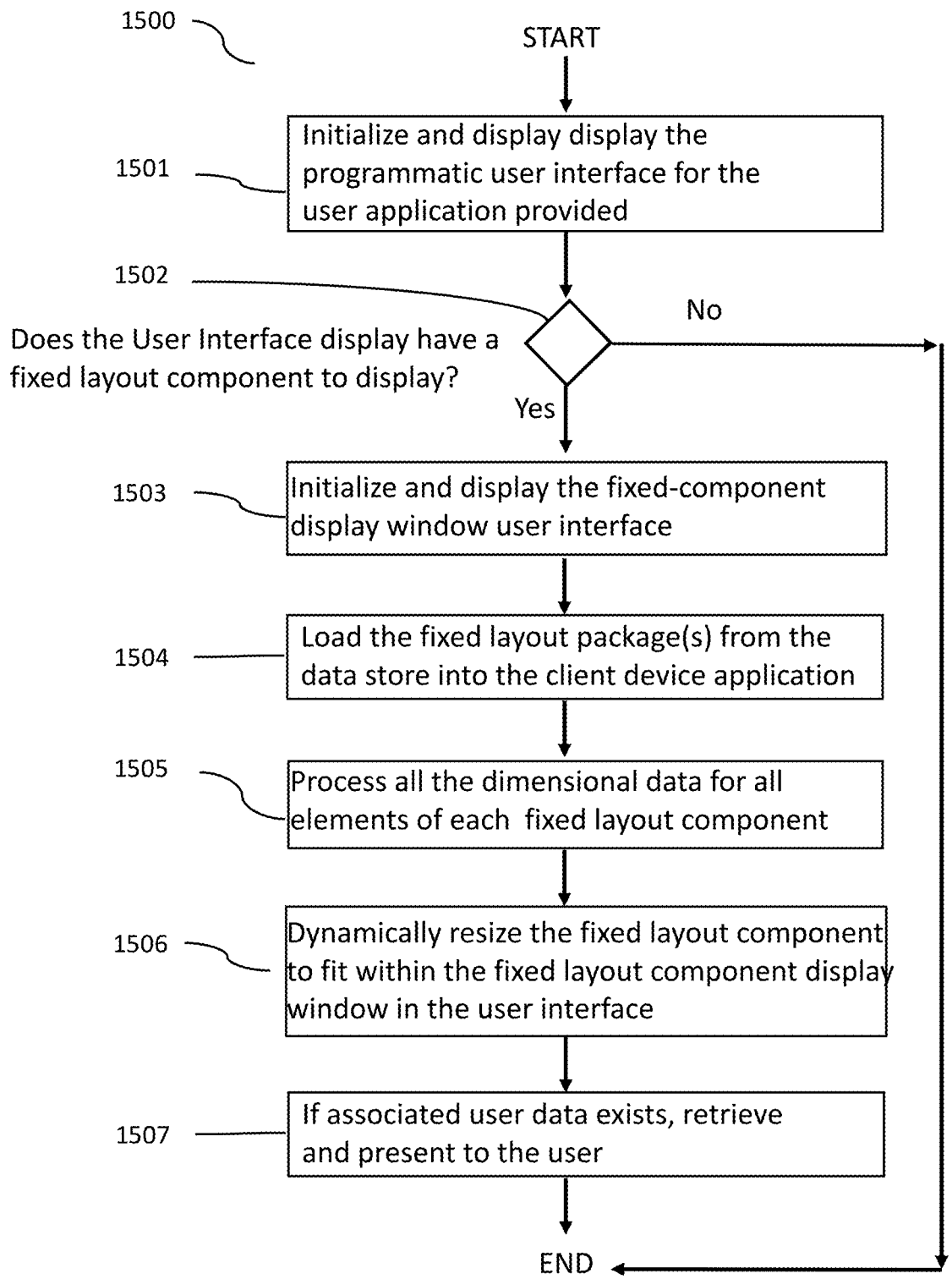
Figure 16A:
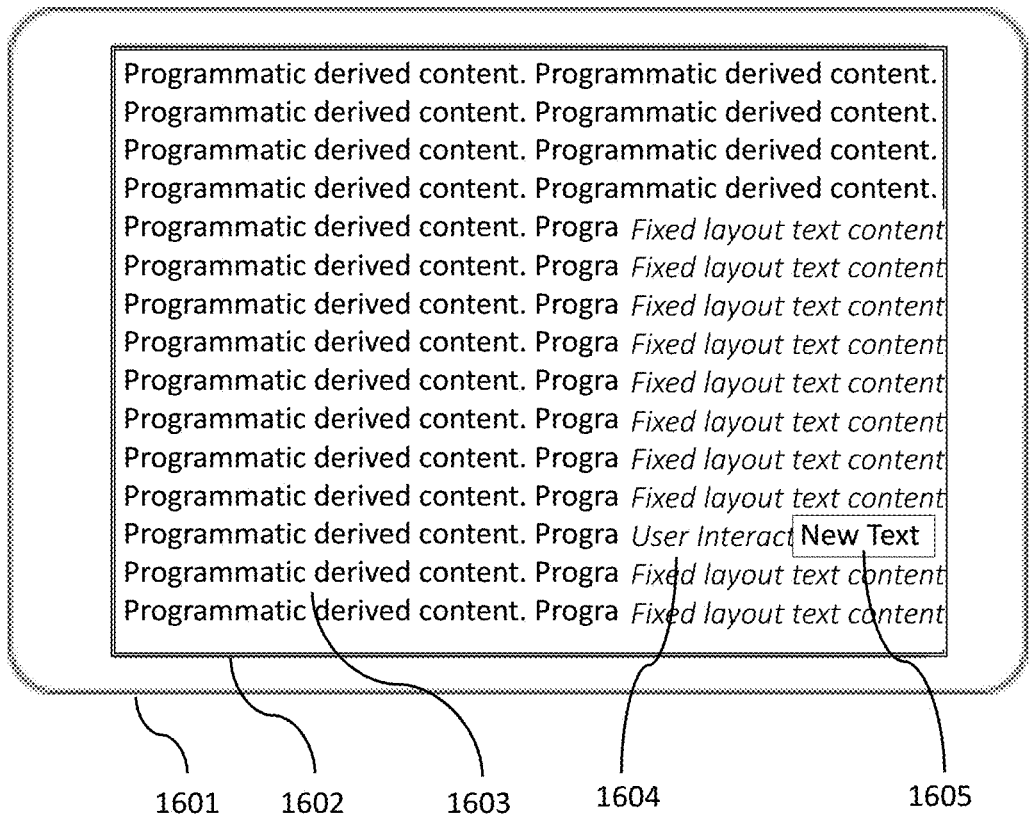
Figure 16B:
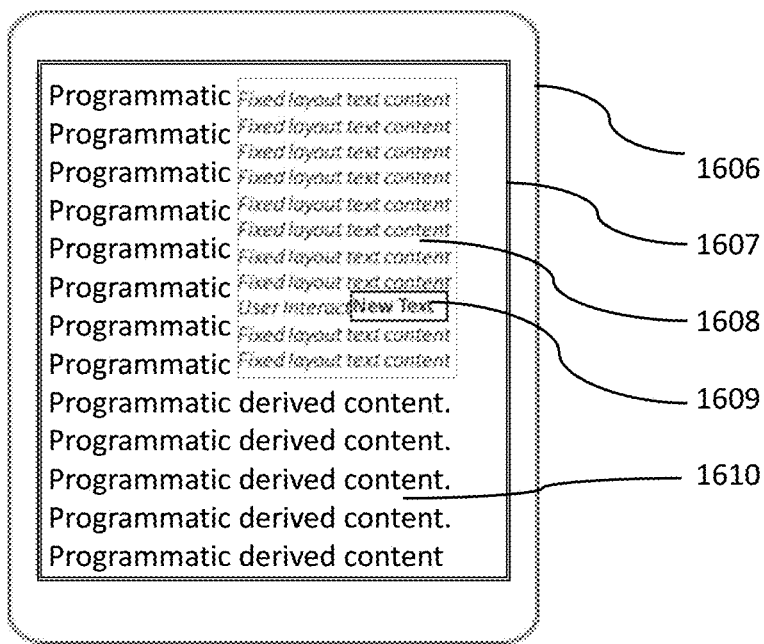
Figure 17A:
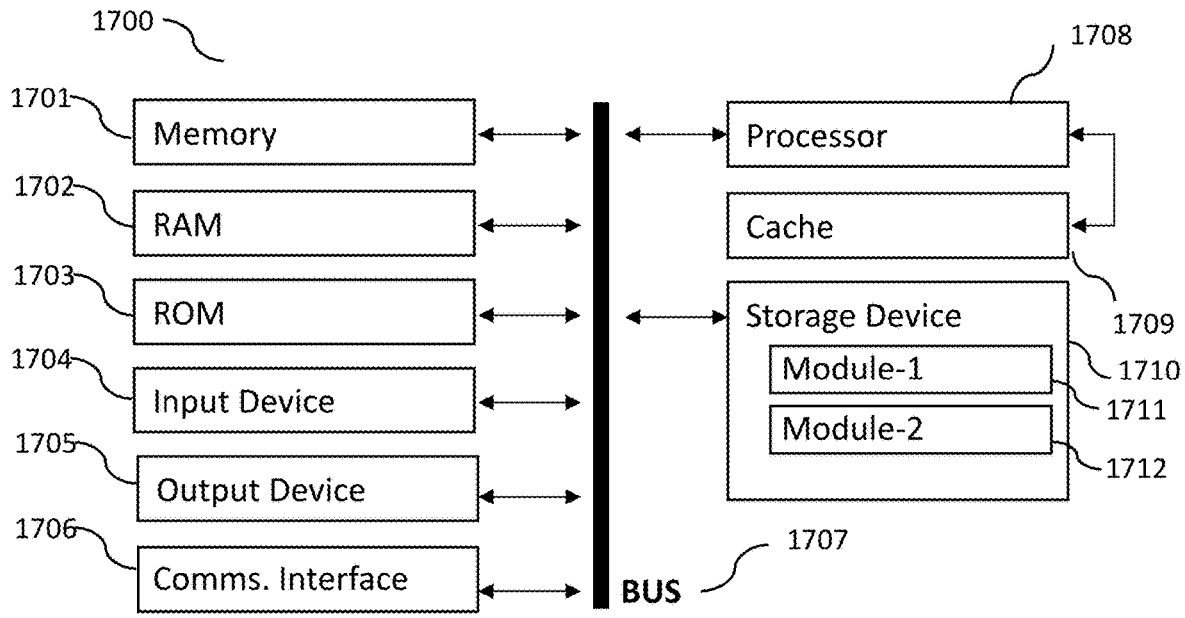
Figure 17B:
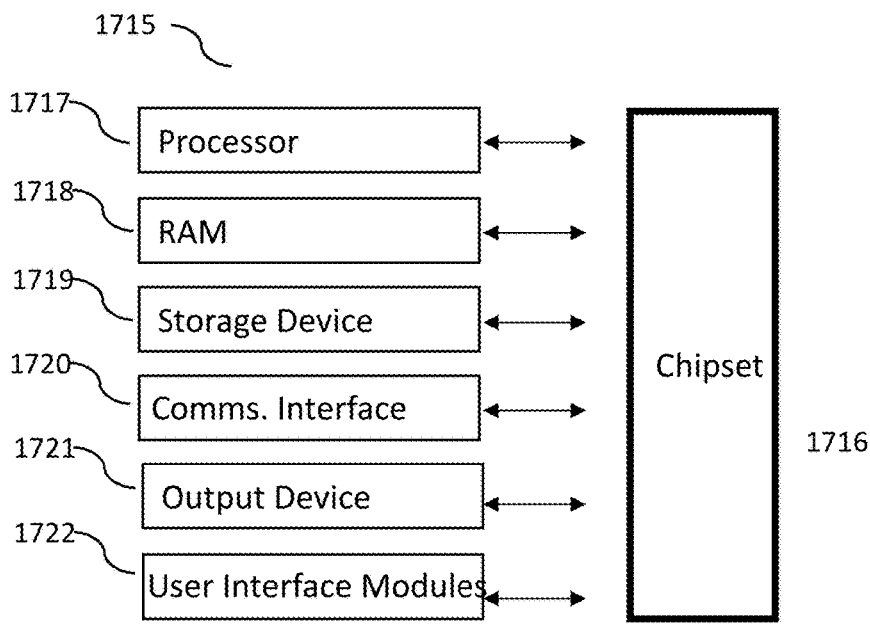
Figure 18:
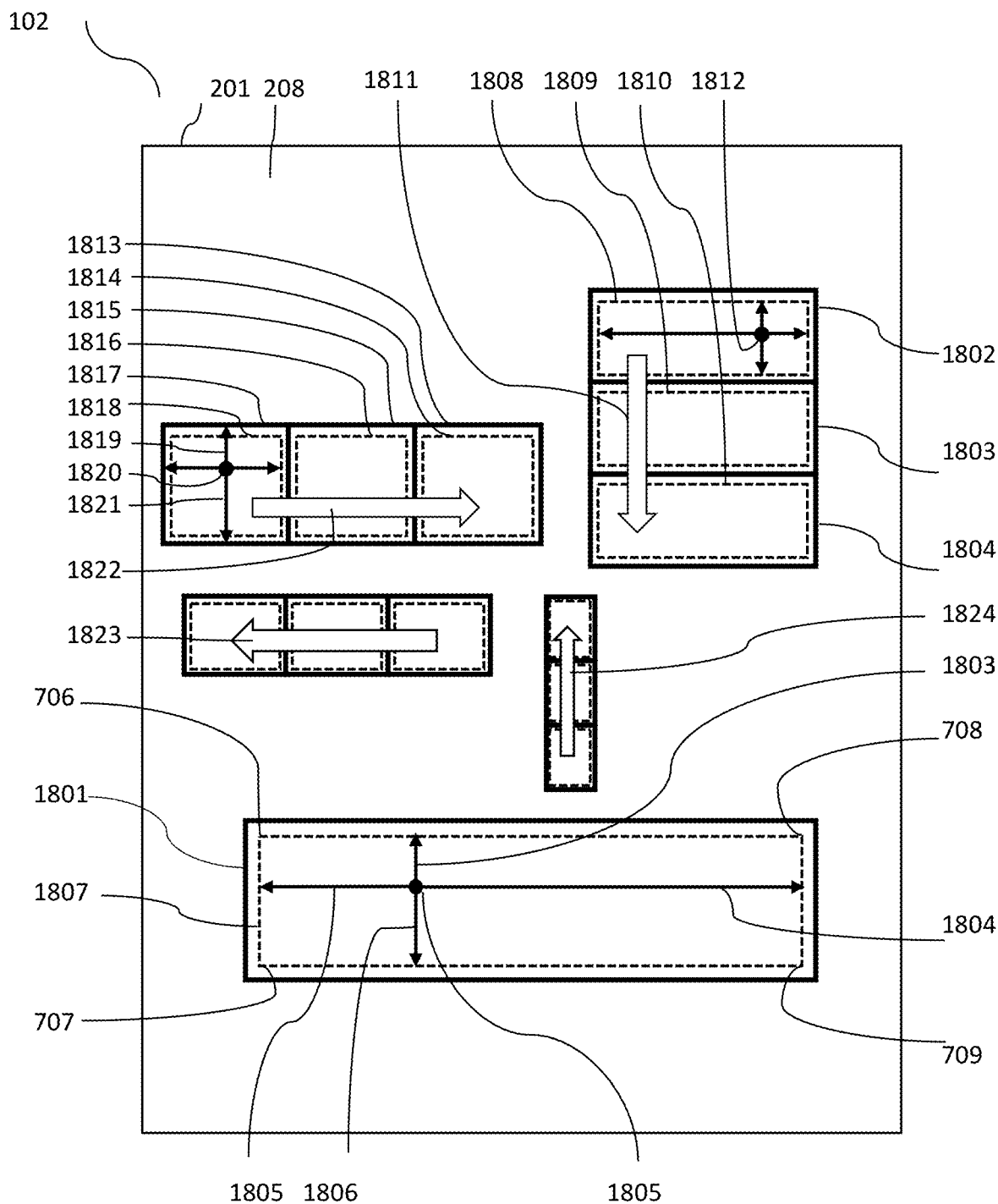
Figure 19:
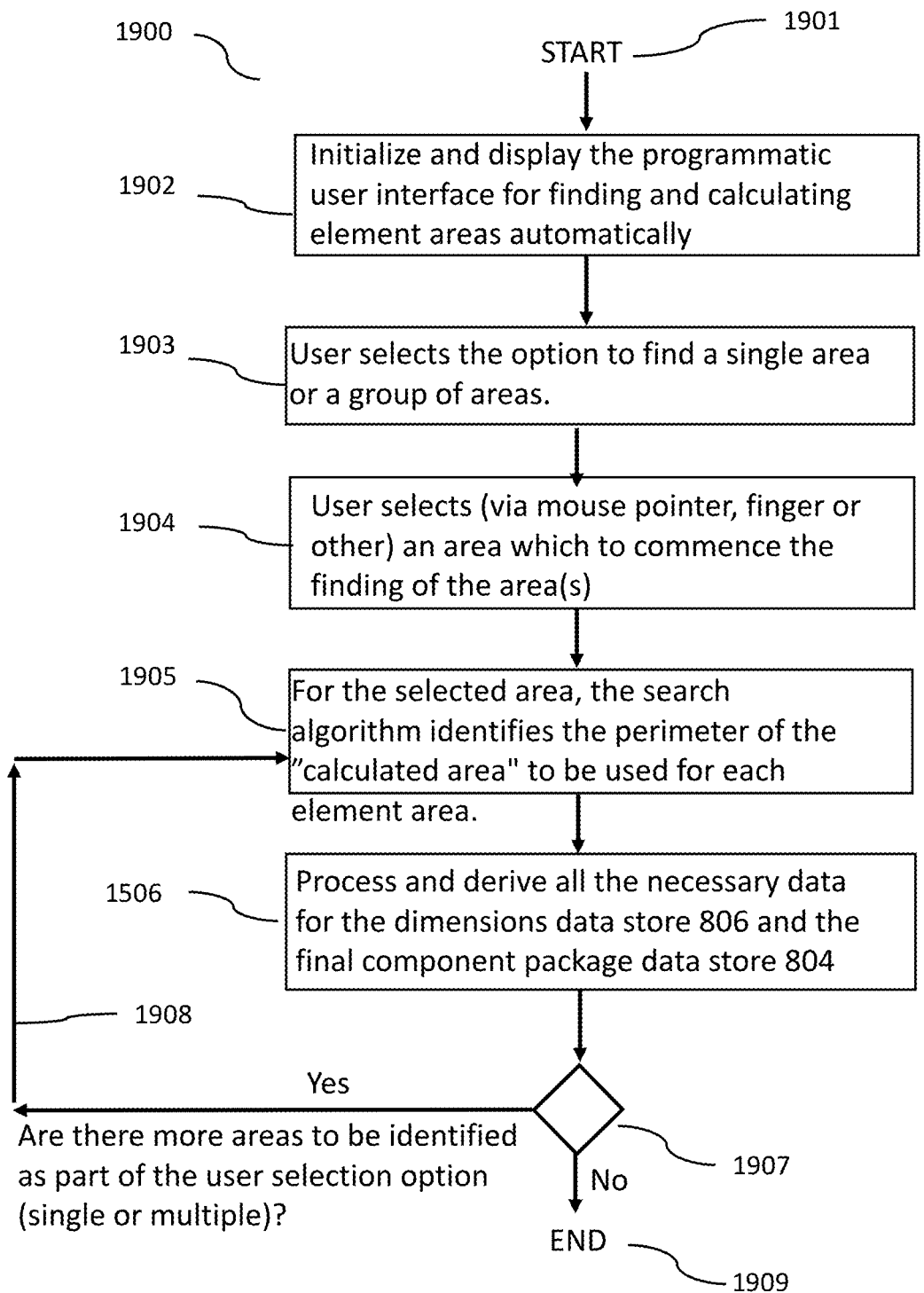
Figure 20:
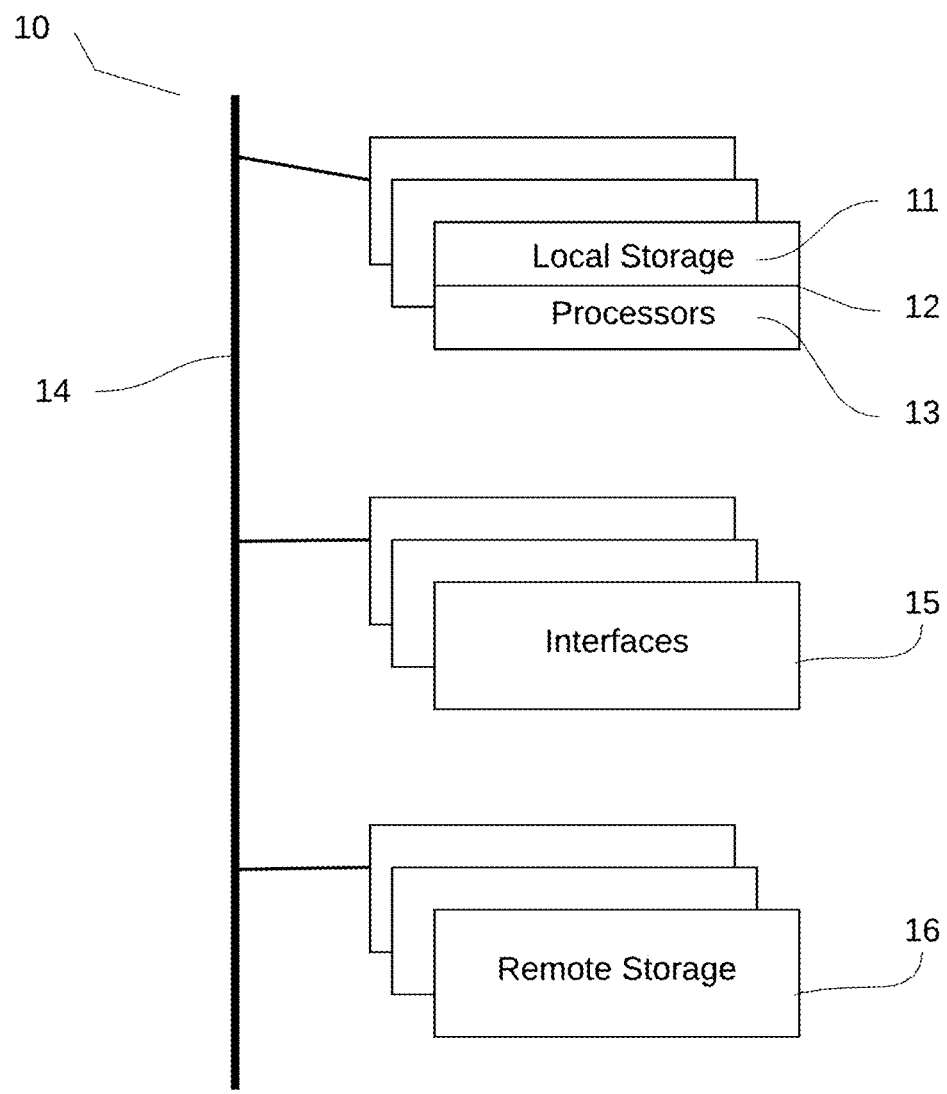
Figure 21:
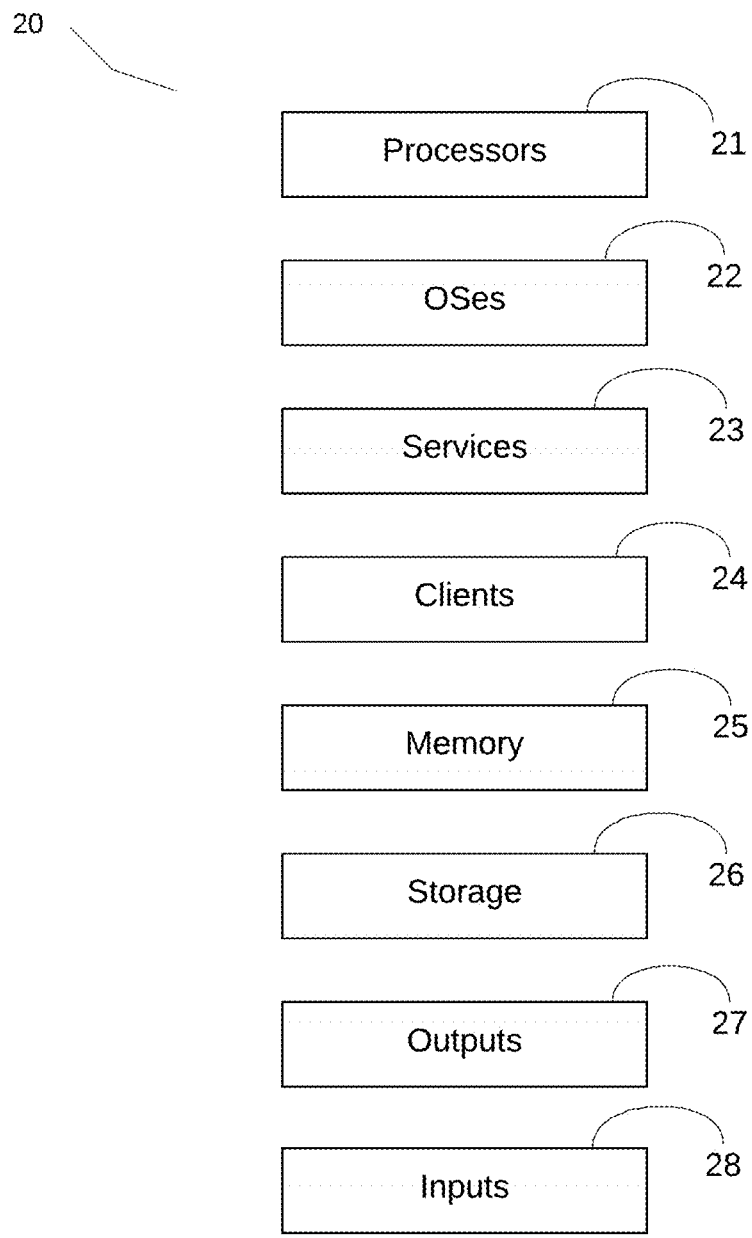
Figure 22:
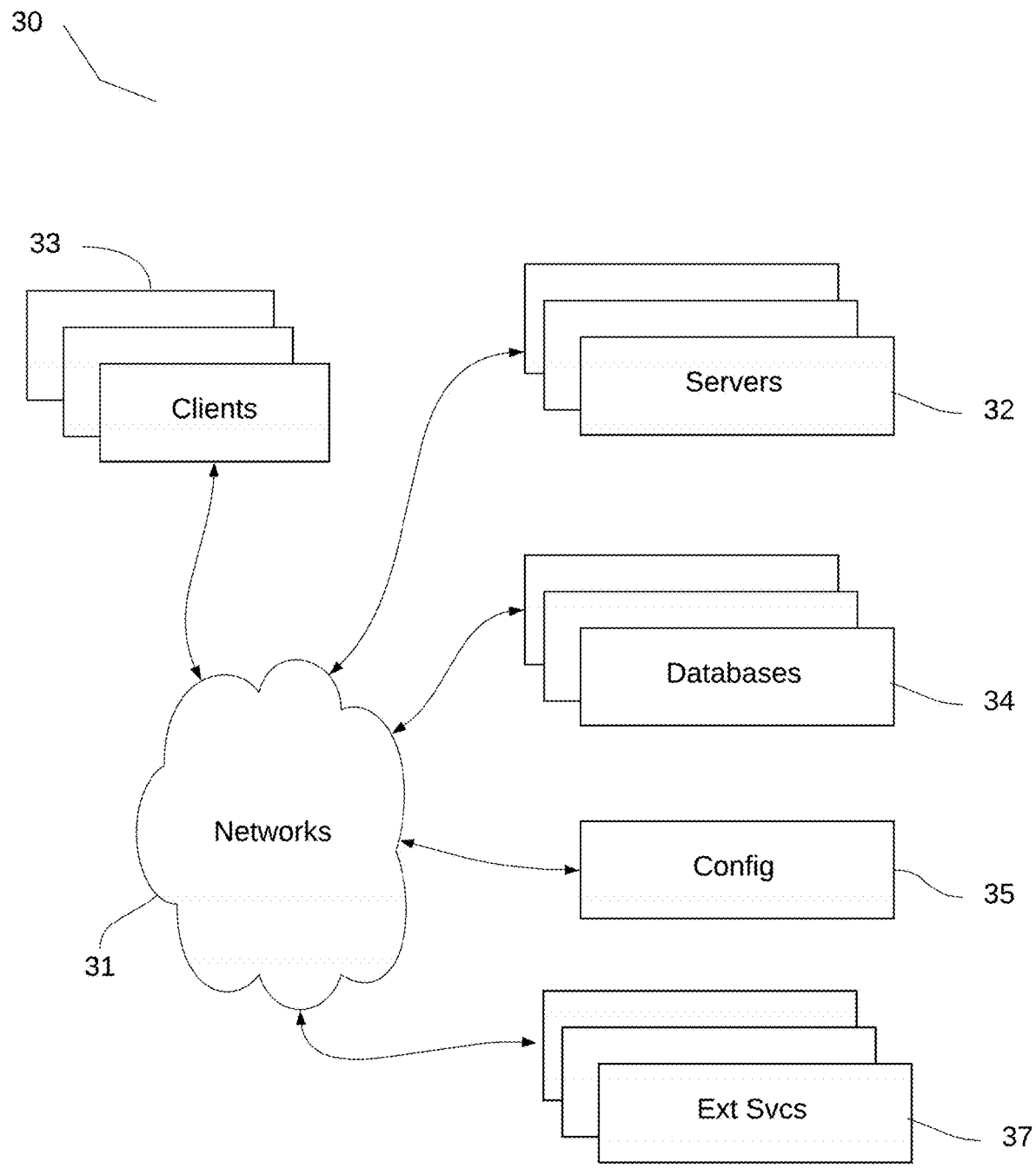
Figure 23:
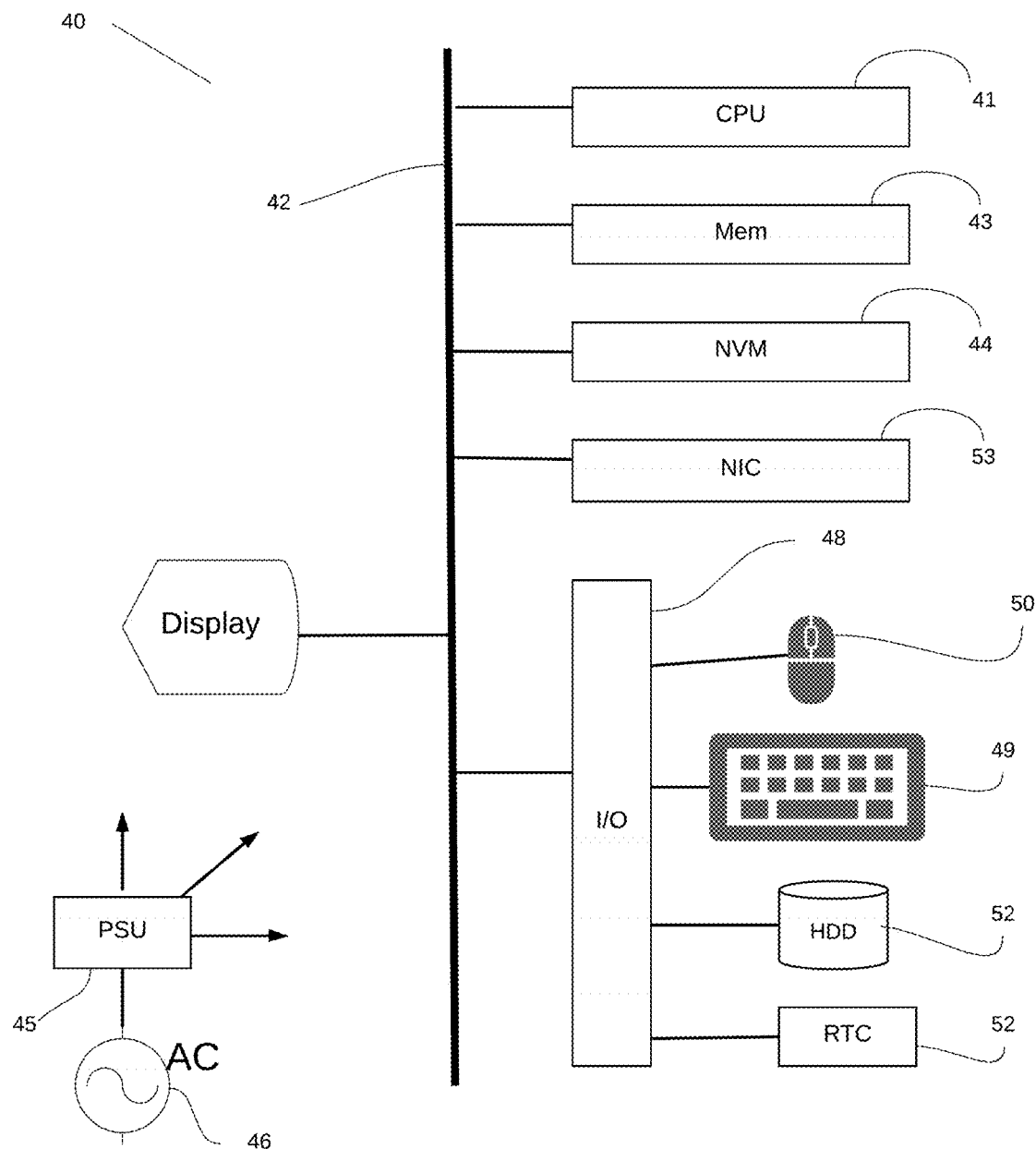
Figure 24:
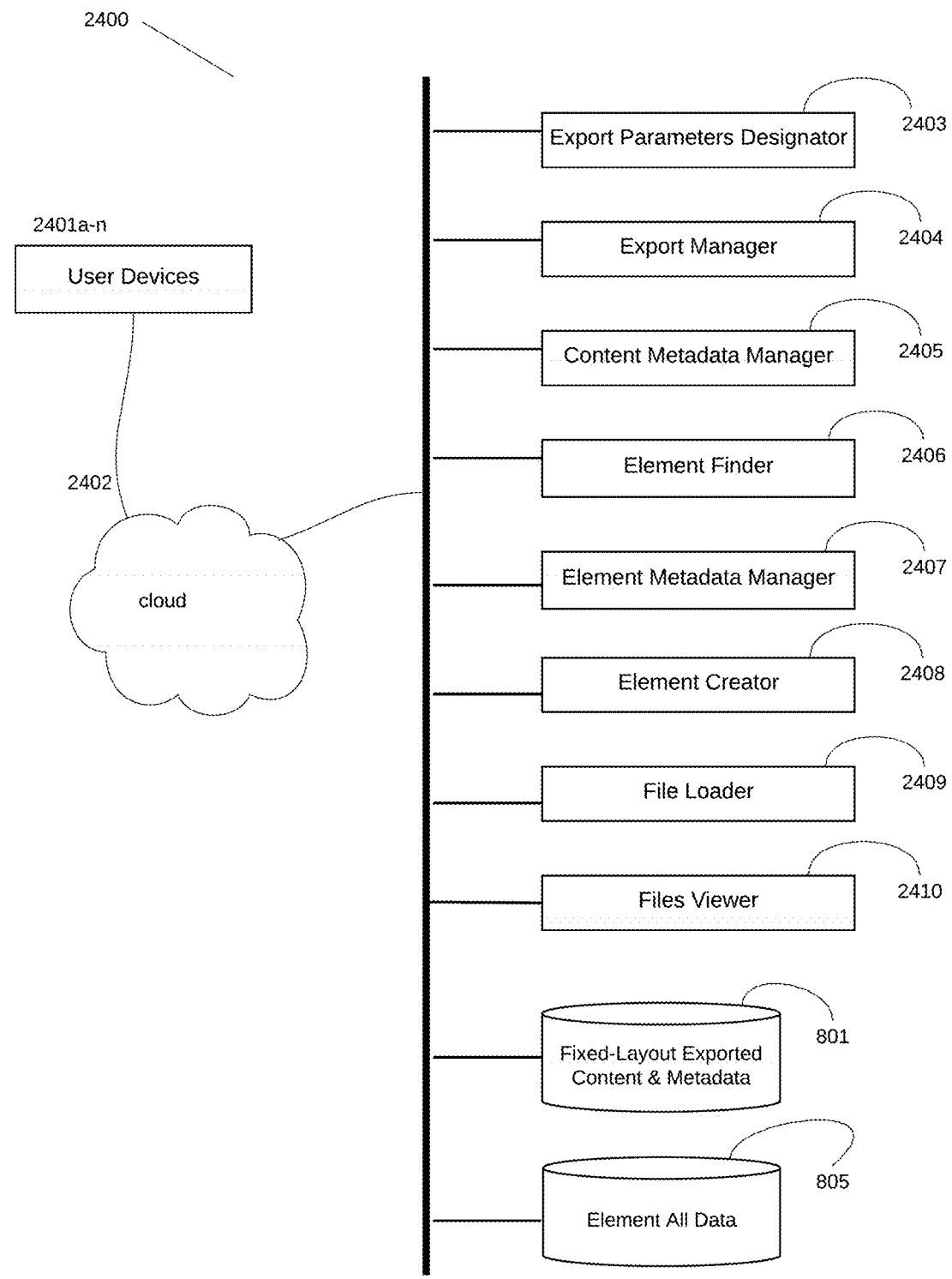
Figure 25:
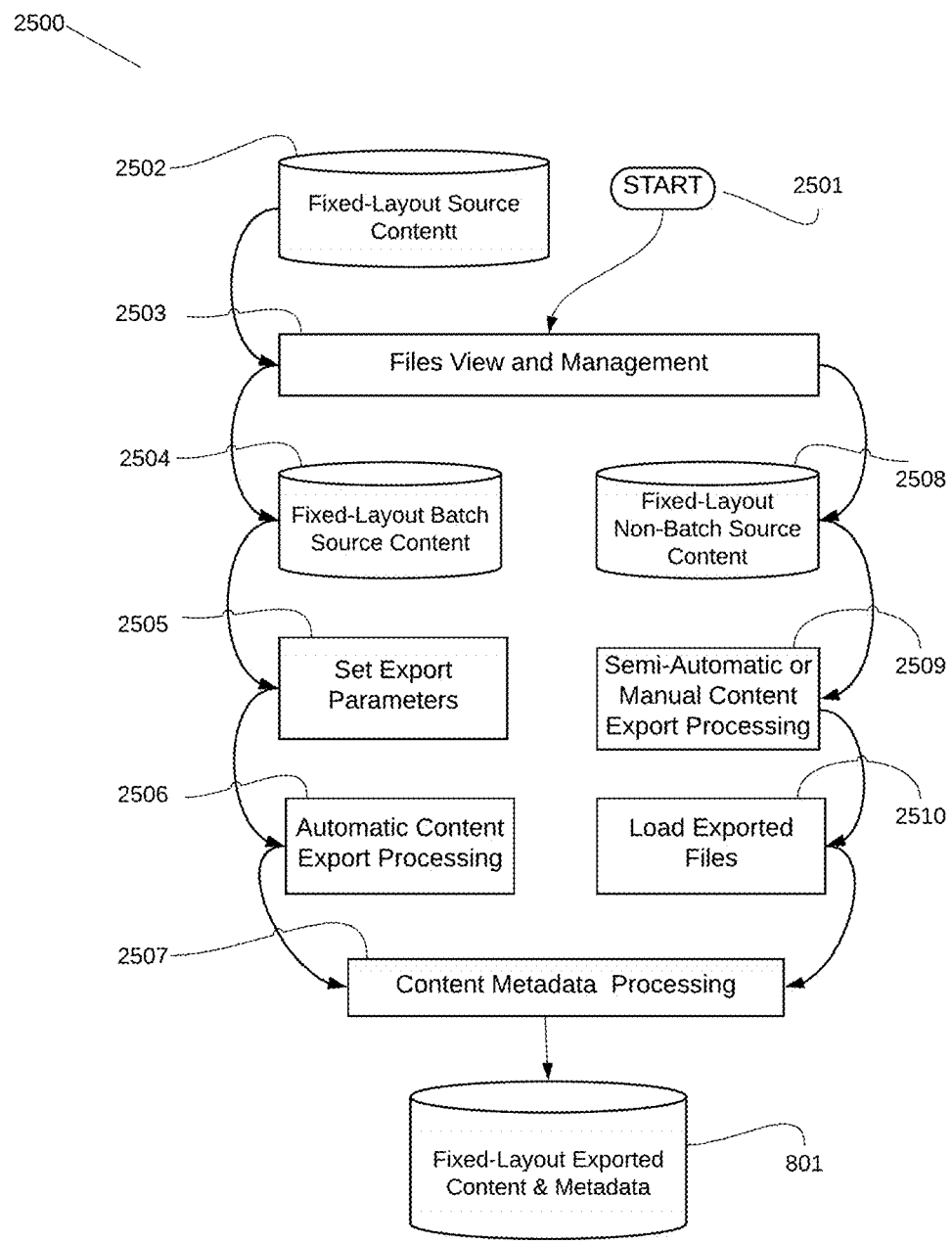
Figure 26:
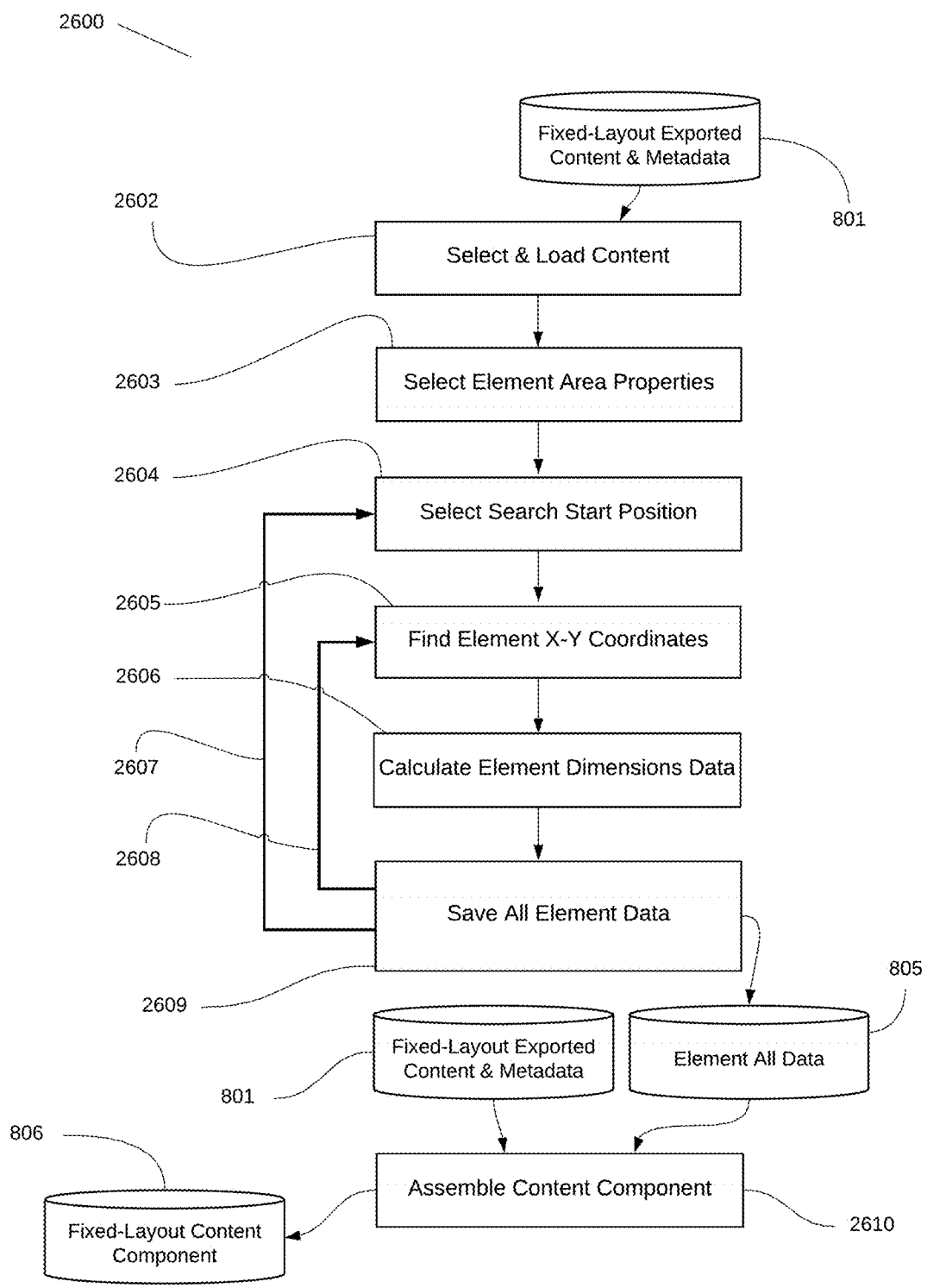
Figure 27:
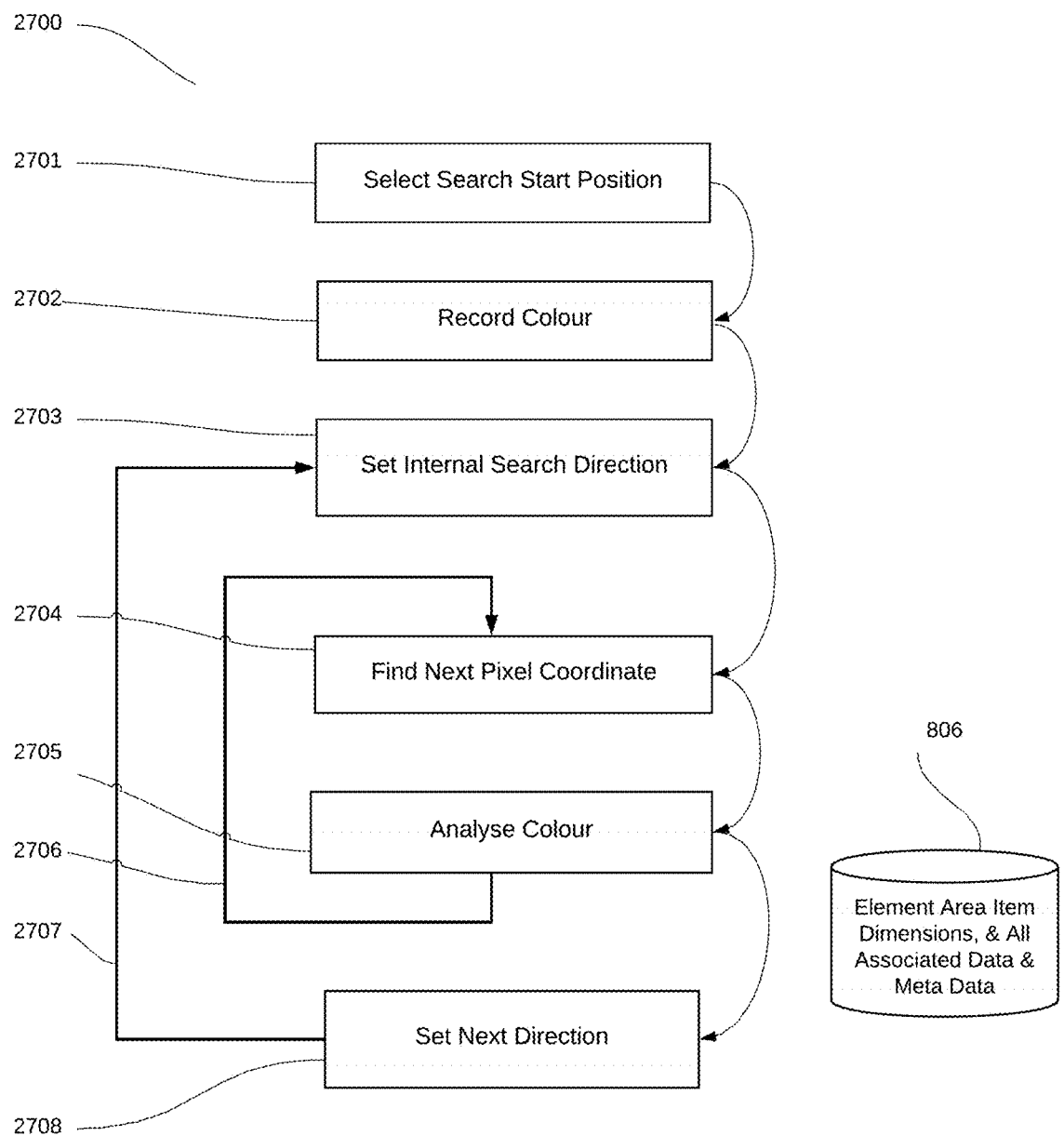
Figure 28:
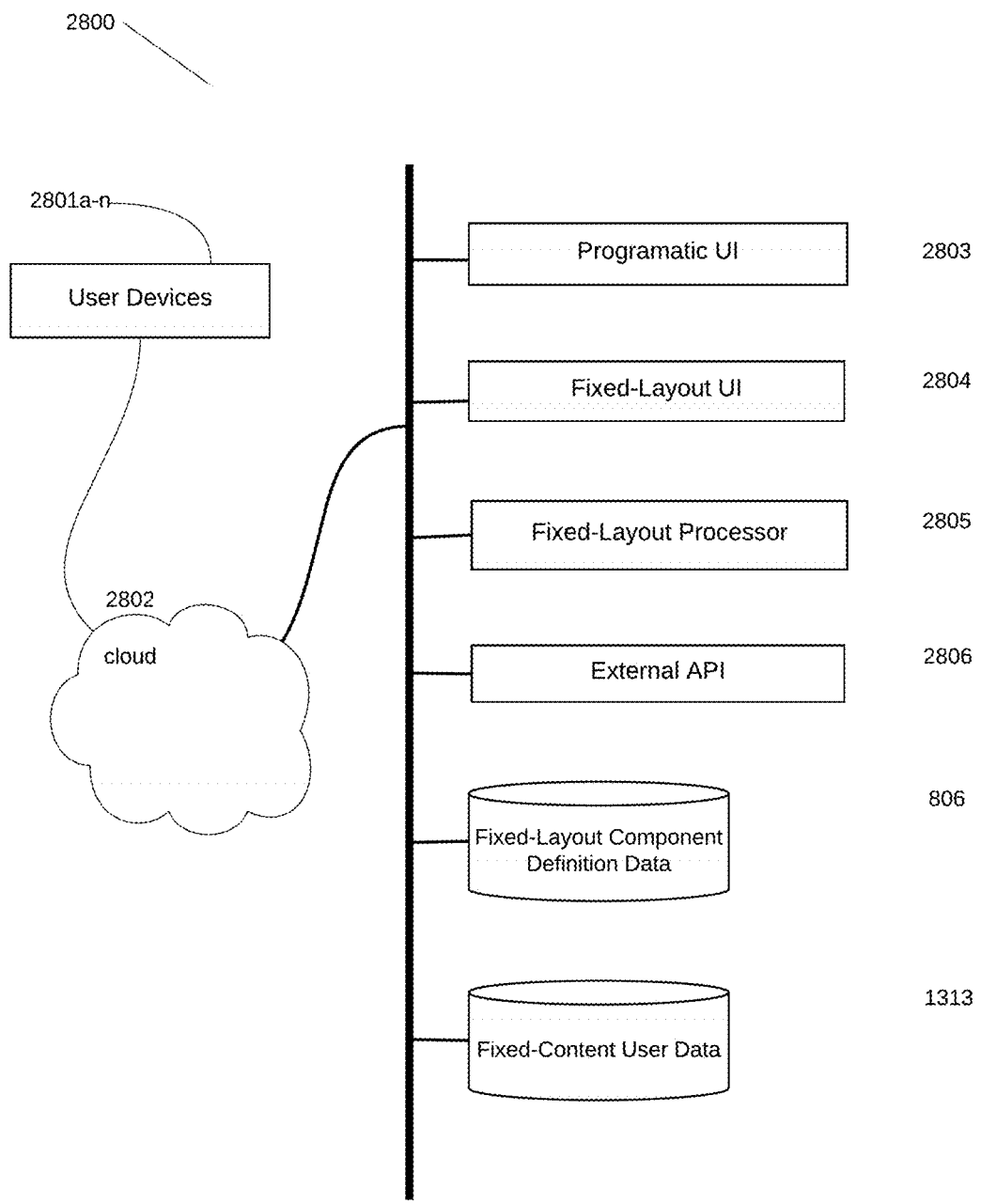

FIGS. 10A, 10B, and 10C illustrate an example of a fixed area window which may be part of the overall user programmatic display window in a display screen, according to an embodiment of the invention;

FIG. 11 illustrates a plurality of exemplary fixed-layout windows and a component contained therein as it is repositioned and automatically resized in various device screens sizes, according to an embodiment of the invention;

FIG. 12 illustrates various examples of a fixed-layout window and a fixed-layout component contained inside a display screen as it is repositioned and resized according to one specific device screens in different orientations, according to an embodiment of the invention;

FIG. 13 illustrates an exemplary interaction between a user device and a server system in the context of an online connected software program, according to an embodiment of the invention;

FIG. 14 illustrates an exemplary interaction between a user device comprising a full application program and an online server system, according to an embodiment of the invention;

FIG. 15 is a high-level flow diagram illustrating an exemplary process for programmatically loading and displaying a plurality of and fixed-layout components, according to an embodiment of the invention;

FIGS. 16A and 16B illustrate an exemplary embodiment of a fixed-layout component combined with programmatic display elements on a tablet user device screen with a plurality of orientations, according to an embodiment of the invention;

FIGS. 17A and 17B illustrate exemplary system components which may be used with the system, according to an embodiment of the invention;

FIG. 18 illustrates an exemplary fixed-layout component which may comprise a fixed-layout content "background" area, and any number of digital graphics (to make up a full or partial area), visual items (text, pictures, etc.), that may comprise a plurality of highlighted areas embedded as part of any number of digital graphics, according to an embodiment of the invention;

FIG. 19 is a high-level flow diagram illustrating at a high level an exemplary process for an automatic finding and calculation of element item areas and associated data for data stores, according to an embodiment of the invention;

FIG. 20 is a block diagram illustrating an exemplary hardware architecture of a computing device used in an embodiment of the invention;

FIG. 21 is a block diagram illustrating an exemplary logical architecture for a client device, according to an embodiment of the invention;

FIG. 22 is a block diagram showing an exemplary architectural arrangement of clients, servers, and external services, according to an embodiment of the invention;

FIG. 23 is another block diagram illustrating an exemplary hardware architecture of a computing device used in various embodiments of the invention;

FIG. 24 is a flow diagram illustrating an exemplary process for exporting fixed-layout content items and associated data stores, according to an embodiment of the invention;

FIG. 25 is a flow diagram illustrating an exemplary process for finding and automatically configuring element areas (single areas and area ranges) that are outlined on or in fixed-layout content items and associated data stores, according to an embodiment of the invention;

FIG. 26 is a flow diagram illustrating an exemplary process for finding and configuring each element area or an adjacent range of element areas, according to an embodiment of the invention;

FIG. 27 is a flow diagram illustrating an exemplary process for automatically finding an element area dimensions inside a figure outline which is embedded in a fixed-layout content item, or for layers additional object areas, according to an embodiment of the invention;

FIG. 28 is a block diagram illustrating an exemplary process for retrieving and displaying fixed-layout components as part of overall application systems, according to an embodiment of the invention.

DETAILED DESCRIPTION

The inventor has conceived, and reduced to practice, systems and methods of programmatically generating and managing a plurality of embedded fixed-layout components and associated items into a display component of a computer system user interface.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

The following description is presented to enable any person skilled in the art to make and use the present invention, and is provided in the context of various embodiments and their requirements. Various modifications to the disclosed embodiments will be readily apparent to those skilled in the art, and the general principles defined herein may be applied to other embodiments without departing from the spirit of the scope of present embodiments. Thus, the invention is not limited to the embodiments shown, but the present embodiments are to be accorded the widest scope consistent with the principles and features disclosed herein.

The disclosed technology and methods addresses the need in the art for creating and utilizing fixed-layout component package(s) which can then be embedded in the overall programmatic user device interface to create one overall interaction for the user. Certain embodiments of the present invention relate to how fixed-layout display component(s) can be created, embedded and managed across a wide range of user devices and device types, and where these component(s) may be displayed consistently (e.g. aspect ratio, positioning, display layer sequence etc.) irrespective of the device type and orientation, and which is independent of the overall programmatic display user interface. The user can interact with data elements which may be contained within the fixed-layout component and which are linked positionally to the underlying fixed-layout component layout area via the defined component specific data. The fixed-layout area component may be resized and repositioned across any device or orientation and where the component(s) may then display in a same consistent manner irrespective of the device screen size or orientation or user viewing area.

Figure 1A:
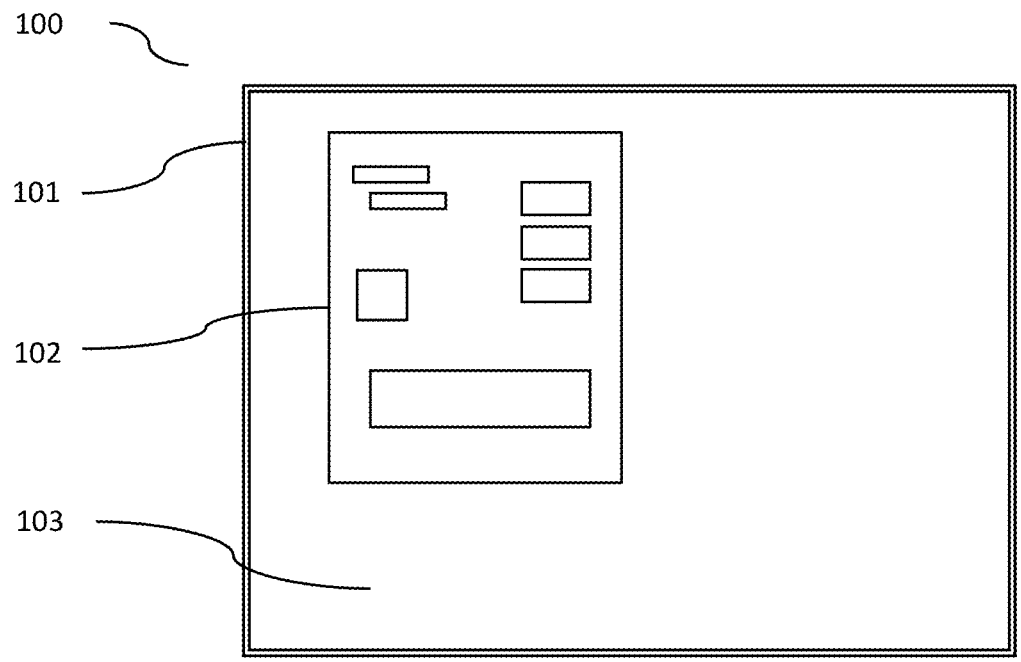
FIGS. 1A and 1B illustrate an exemplary user device screen detailing the programmatic display area and an embedded fixed-layout component display, according to an embodiment of the invention.

FIG. 1A illustrates an exemplary user device screen detailing the programmatic display area and an embedded fixed-layout component display, according to an embodiment of the invention. According to the embodiment, device overall display area 100 may comprise fixed-layout display area component 102, and an area of screen 103 which is generated programmatically. The resulting overall user interface may be a combination of fixed-layout component(s) and programmatic elements.

Figure 1B:
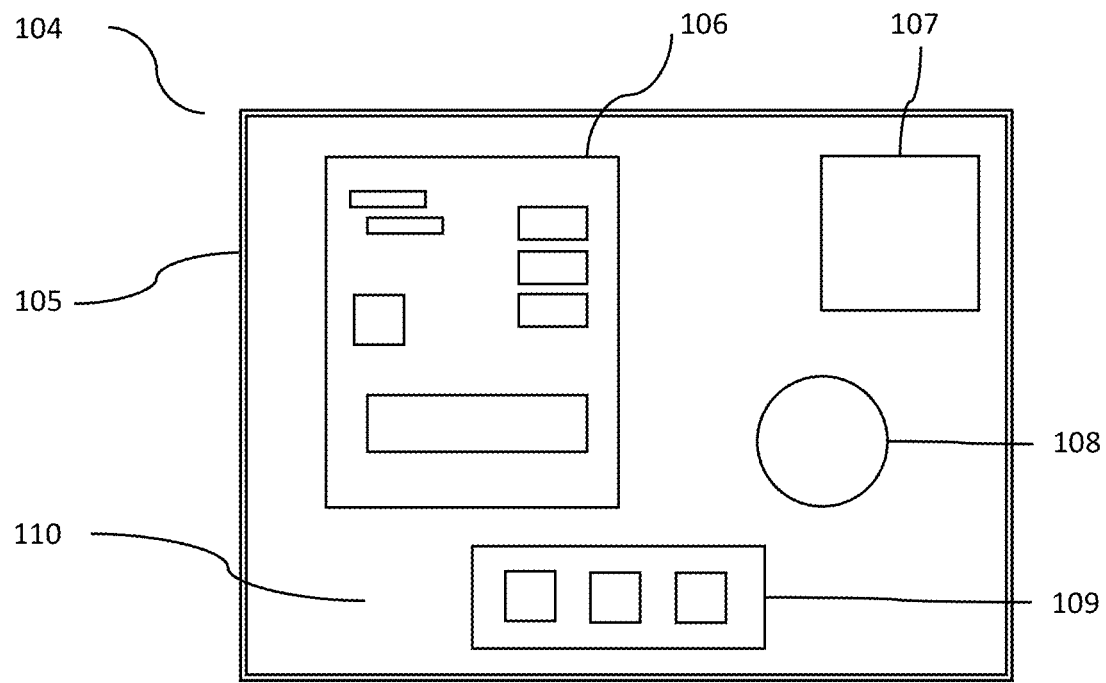

FIG. 1B illustrates an exemplary user device screen detailing the device screen 104, the programmatic display area 110, and a number of embedded fixed-layout components 106, 107, 108, 109 displayed, according to an embodiment of the invention.

Figure 2A:
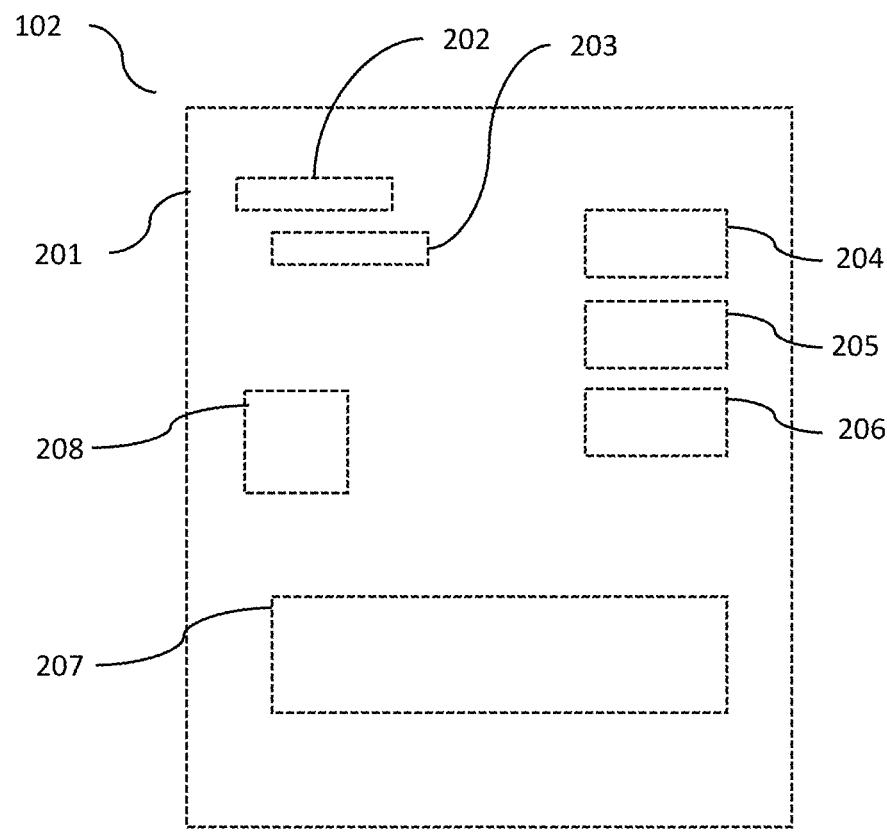
FIGS. 2A and 2B illustrate an exemplary expanded view of a fixed-layout display component, according to an embodiment of the invention.

FIG. 2A illustrates an exemplary expanded view of a fixed-layout display component, according to an embodiment of the invention. According to the embodiment, fixed-layout display component 102 may be an enlarged view of 102 (referring to FIG. 1A). This fixed-layout component 102 may comprise fixed-layout component elements; area 201, and any number of associated fixed-layout element item 202, 203, 204, 205, 206, 207, 208. The fixed-area component element areas 202, 203, 204, 205, 206, 207, 208, may be fixed positionally relative to the overall area of component area 201, and therefore relative to all the other component elements referenced. The fixed-layout element areas may be contained within the fixed area content item 201, or any programmable shape area, including rectangles, triangles, circles, and/or other shapes which may be overlaid on top of area 201. Each fixed-layout element area 202, 203, 204, 205, 206, 207, 208 may comprise one or many content items (e.g. images). The component area 201 which is visible (that is, not hidden from view by the element areas) can have a programmable generated user interactivity (e.g. data text entry, selection, etc.). Elements areas 202, 203, 204, 205, 206, 207, 208 may have a plurality of programmable generated user interactivity associations. Programmable interactivities allows additional functions on overall component area 201 or on any element 202, 203, 204, 205, 206, 207, 208 which may be associated with the overall component 102, or any combination thereof.

Figure 2B:
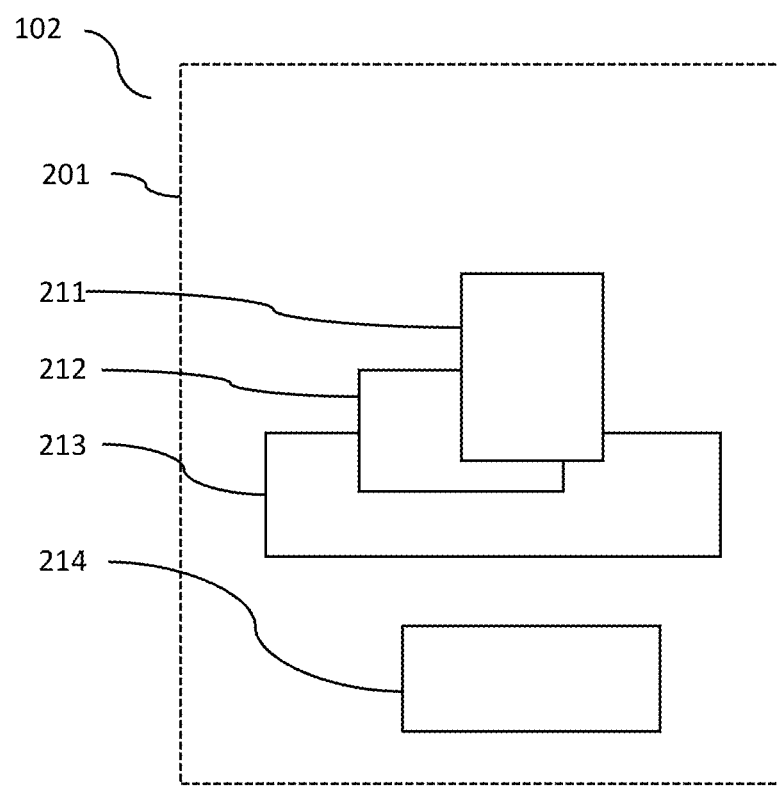

FIG. 2B illustrates another exemplary view of a fixed-layout display component, according to an embodiment of the invention. According to the embodiment, fixed-layout component 102 (referring to FIGS. 2A and 2B) may be an enlarged view of 102 in FIG. 1A. The component 102 may comprise fixed-layout component area 201, which may comprise any number of fixed-layout element items 211, 212, 213, 214. According to the embodiment, the fixed-layout element items 211, 212, 213 may be partially overlapping with each other. Each fixed-layout area (that is, the overall area 201, and elements 211, 212, 213, 214) may each be associated with relevant display-layer identifier data. The display-layer identifier data may be used when the overall fixed-layout component is being displayed in a user device screen 101 (referring to at least FIG. 1A) to determine the display order or sequence of the various areas for display within the component. The display-layer identifier data may determine areas that may be visible on an interface display (for example, of a user device) and which may be partially or fully hidden from direct view (for example, by a user via the user device), as illustrated in FIG. 2B. Further according to the embodiment, overall area 201 may have, for example, a display-layer identifier=1, and area 213 and 214 may have, for example, a display-layer identifier=same as each other=2, and area 212 may have, for example, a display-layer identifier=3, and area 211 may have, for example, a display-layer identifier=4.

Dimensions General Definition

In some embodiments, all dimensions relating to a fixed-layout component may be related to "digital-imaging" or "digital-content" and may be measured or represented in a pixel, pel, dots or picture element or other related methods for dimensions. These measurement types may, in some embodiments, relate to a physical point in a raster image, or to a smallest addressable element. For convenience, the term "pixels" as the exemplary definition of a dimension will be used hereinafter, but noting that a wide range of other methods may also be used to achieve a similar or the same result.

For convenience, pixels may be normally arranged in a regular two-dimensional grid. The location of co-ordinates address (or other exemplary method) of a pixel will correspond to its physical coordinates within this dimensional area. All dimensions referenced will relate to a two-dimensional view.

Figure 3:
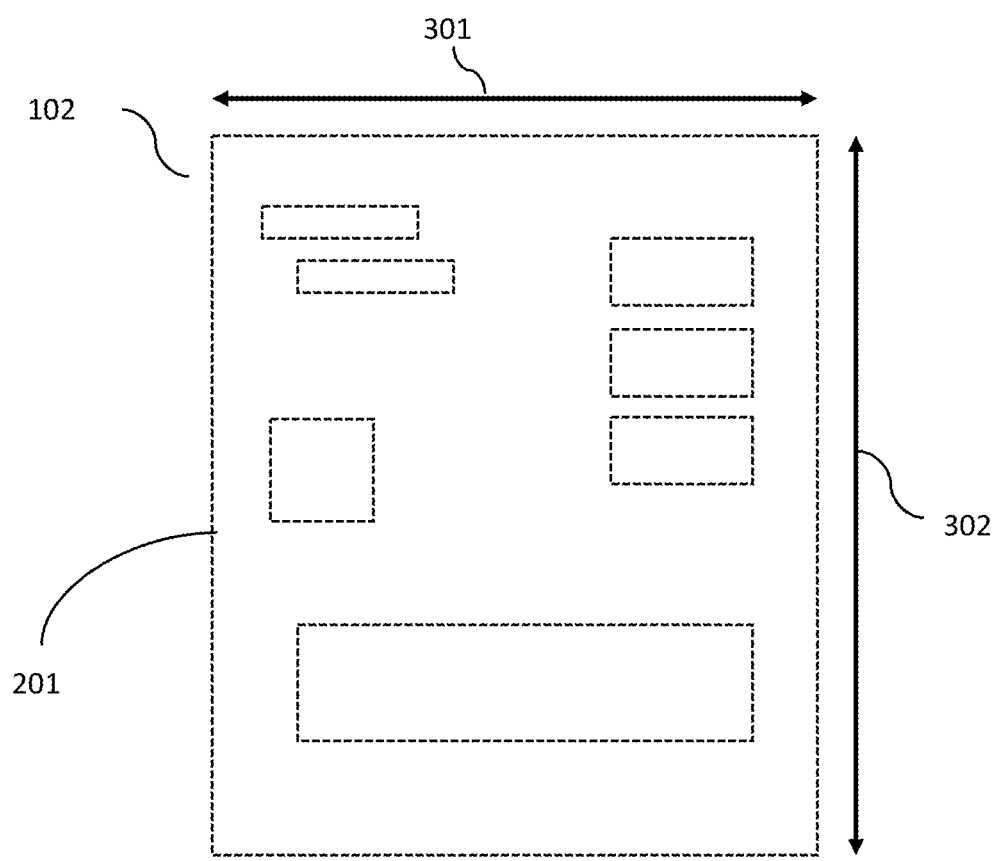
FIG. 3 illustrates an exemplary definition of dimensions of a plurality of fixed-layout component according to an embodiment of the invention.

FIG. 3 illustrates an exemplary definition of dimensions of a plurality of fixed-layout component according to an embodiment of the invention. According to the embodiment, fixed-layout component 102, fixed-layout component are 201, detailing width 301 and height 302 dimensions may be used to derive a fixed-layout component aspect-ratio (dimension width 301 divided by dimension height 302) and which may always be used in the display/redisplay of this fixed-layout component area across any device/screen and to ensure that the calculated aspect-ratio is what may always be displayed in user device screen 101, irrespective of the actual aspect ratio or orientation of a physical screen associated to user device 101.

Figure 4:
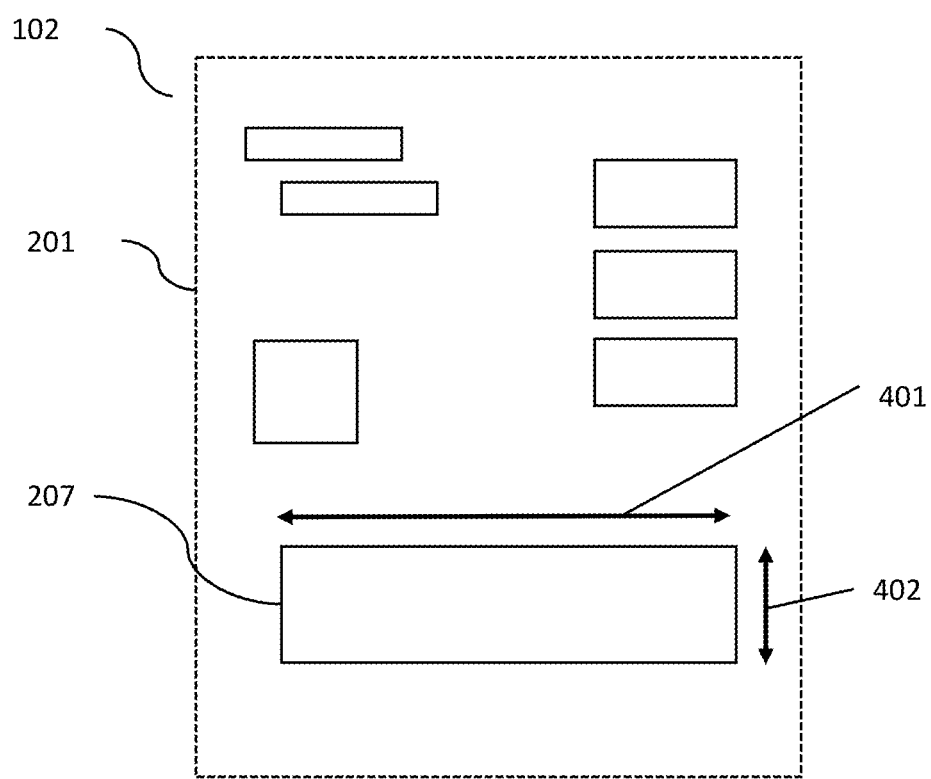
FIG. 4 illustrates an exemplary definition of dimensions of a plurality of element items that may be part of a fixed-layout component display, according to an embodiment of the invention.

FIG. 4 illustrates an exemplary definition of dimensions of a plurality of element items that may be part of a fixed-layout component display, according to an embodiment of the invention. According to the embodiments, fixed-layout component 102, with the fixed-layout component area 201. FIG. 4 further illustrates component element fixed area 207 detailing element width 401 and element height 402 dimensions and which may be used to derive a component element aspect-ratio (that is, dimension width 401 divided by height 402) which may be used in display/redisplay of this fixed-layout element across any device/screen as part of specific fixed-layout component 102.

Figure 5A:
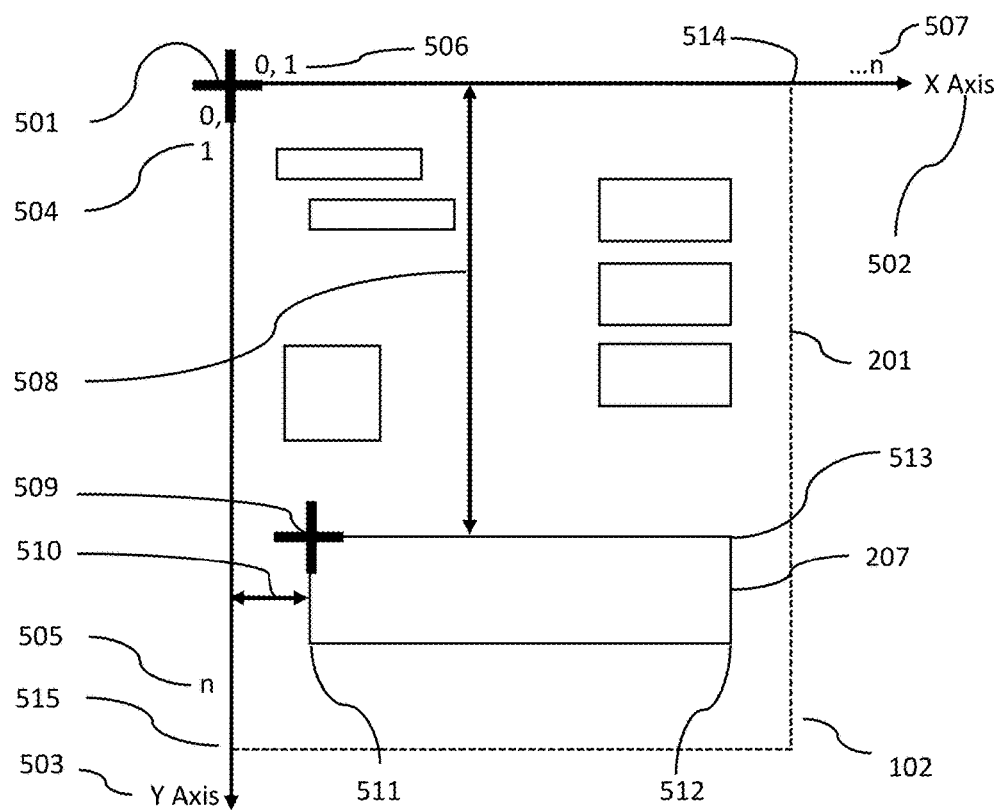
FIGS. 5A and 5B illustrate an example of positional dimensions of an element in relation to a defined reference location on an overall fixed-layout component area, according to an embodiment of the invention.

FIG. 5A illustrates an example of positional two dimensions (2D) of an element area 207 in relation to a defined reference location 509 on an overall fixed-layout component area, according to an embodiment of the invention. According to the embodiment, an exemplary method to calculate the dimensional data for elements within a component and which measure the elements size and position precisely in relation to the overall component area 201 is shown. According to the embodiment, an exemplary method to use 2D dimensional x and y axis methodology to determine specific x-y coordinates is also presented.

In FIG. 5A, the fixed-layout component reference point 501 may be any fixed location associated to component area 201. Component area 201 may have associated dimension x-Axes 502 and y-Axes 503 and direction. Accordingly, each fixed-layout element may have an associated reference point in a two-dimensional dimension display grid which may have an x-Axis 502 and a y-Axis 503. Each Axes may each have dimensional values from 0, 1 (506) to "n" (507) as for the x-Axis and from 0, 1 (504) to "n" (505) as shown for the y-Axis. Each dimension point will have an x and y dimension pair value in the x-y two-dimensional dimension grid. Further according to the embodiment, element area 207 may have associated reference point 509 displayed which may have a unique x and y co-ordinate pair values for dimension position. In this embodiment, the component reference point 501 can have a position of 0, 0 for the x, y dimension's pair. Element 207 may be positionally and dimensionally related to the component reference point 501 via the element reference height 508 and the element reference width 510 dimensions. The element 207 may have a fixed dimension size for width and height 401, 402 and position 508, 510 relative to the overall component area 201, and with size/area 301, 302. All of these dimension values can be derived from the corresponding x and y co-ordinate position pair dimension values of all corner points (known as "element area definition positions") for the overall component area and associated element areas (for the element type shown: rectangle areas). The x and y coordinate values for the element area 207 corner points 509, 511, 512, 513 may be used to derive the element width and height dimensions as well as area and the position of the area relative to the overall fixed-layout component area. It should be understood by those with ordinary skill in the art that alternate methods may be used to arrive at the same feature, functionality, or conclusion.

Figure 5B:
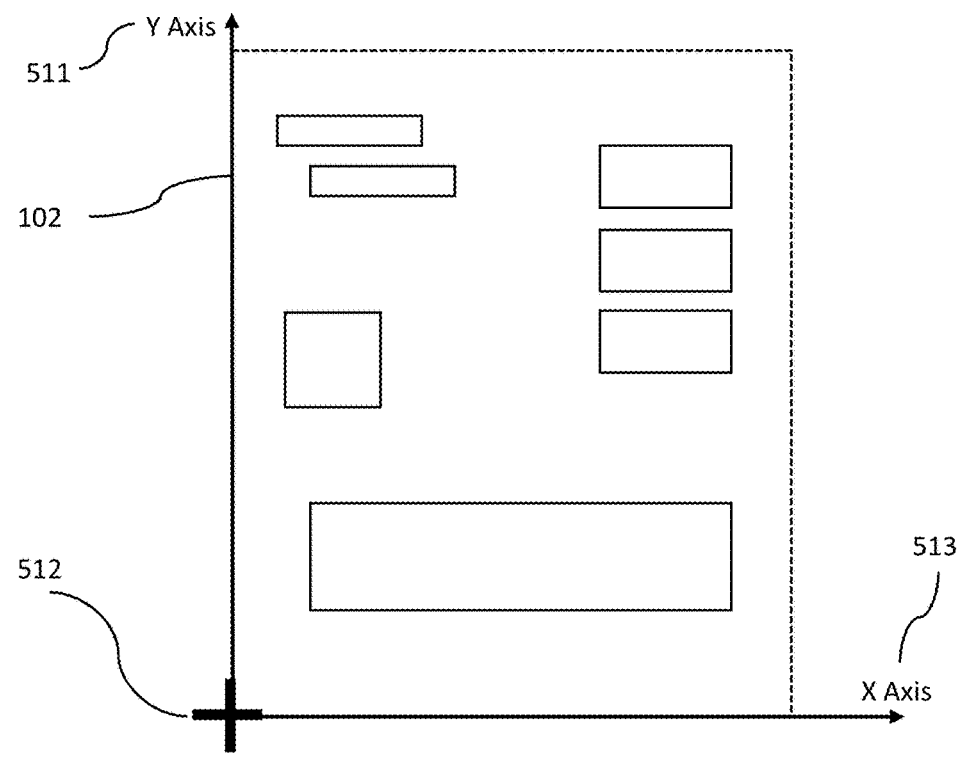

FIG. 5B illustrate an exemplary variation of positional dimensions of an element in relation to a defined reference location on an overall fixed-layout component area, according to an embodiment of the invention. According to the embodiment, an exemplary variation of FIG. 5A is shown with respect to the y-Axis dimension 511 orientation, as compared to the y-Axis 503 as demonstrated in FIG. 5A. However, there may be many other different approaches to measuring the various dimensions required to deliver a same required result of maintaining the positional and area and size integrity of all items relative to each other, and in relation to the overall component area, and which are part of each specific fixed-layout component 201.

Figure 6A:
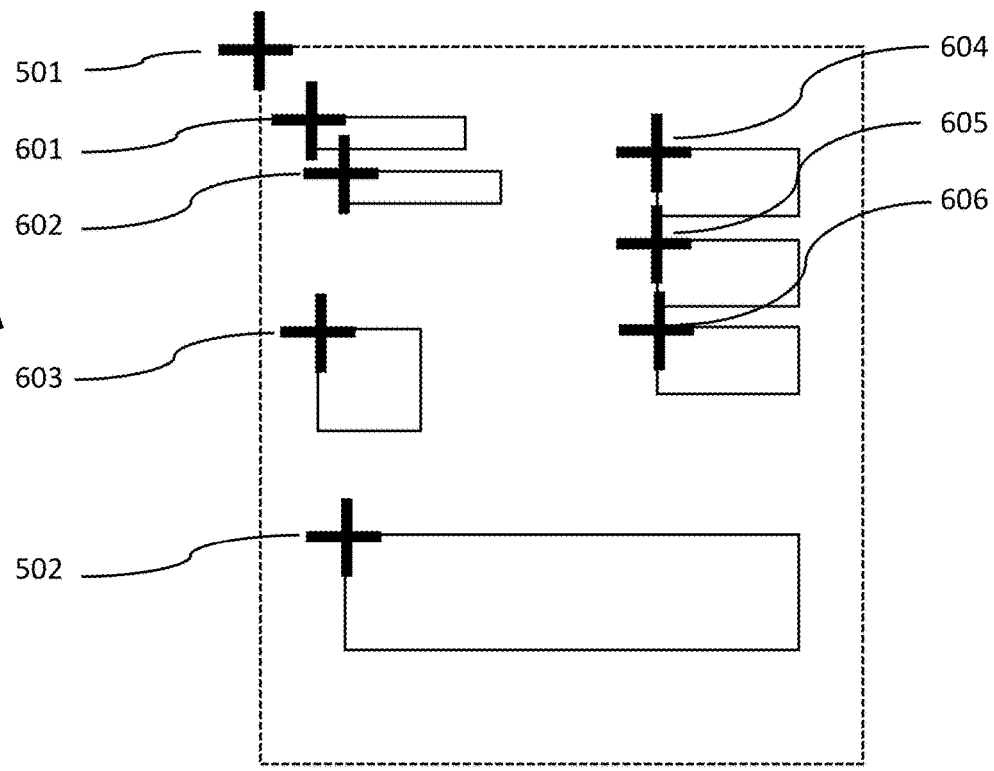
FIGS. 6B and 6B illustrate examples of different reference position location for a plurality of elements and a reference position location for the overall fixed-layout component area, according to an embodiment of the invention.

FIG. 6A illustrates an example of a reference position location for a plurality of elements and a reference position location for the overall fixed-layout component area, according to an embodiment of the invention. According to the embodiment, how each element reference point 502, 601, 602, 603, 604, 605, 606 may be connected, and referenced back to the component reference point 501 via the reference height 503, and reference width 504 of each element may be shown.

Figure 6B:
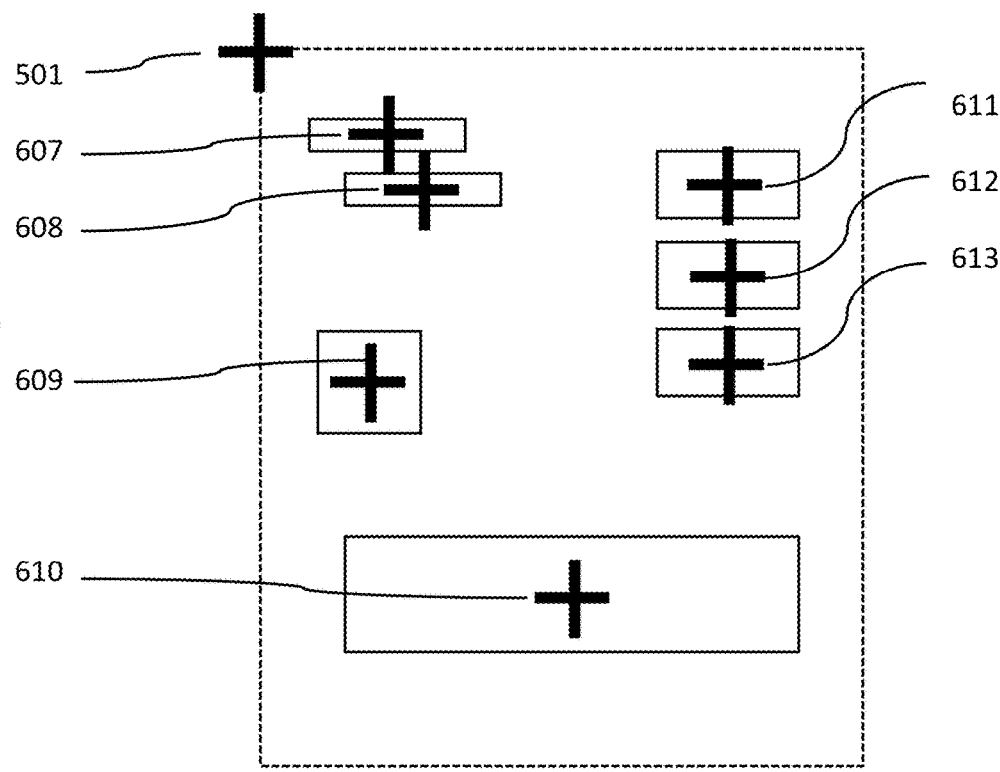

FIG. 6B illustrates an example of a different reference position location for a plurality of elements and a reference position location for the overall fixed-layout component area, according to an embodiment of the invention. According to the embodiment, element reference points 607, 608, 609, 610, 611, 612, 613 may be positioned centrally in each component element. It should be understood by those experienced in the art that alternate methods could be used to arrive at the same feature, functionality, or conclusion.

Figure 7A:
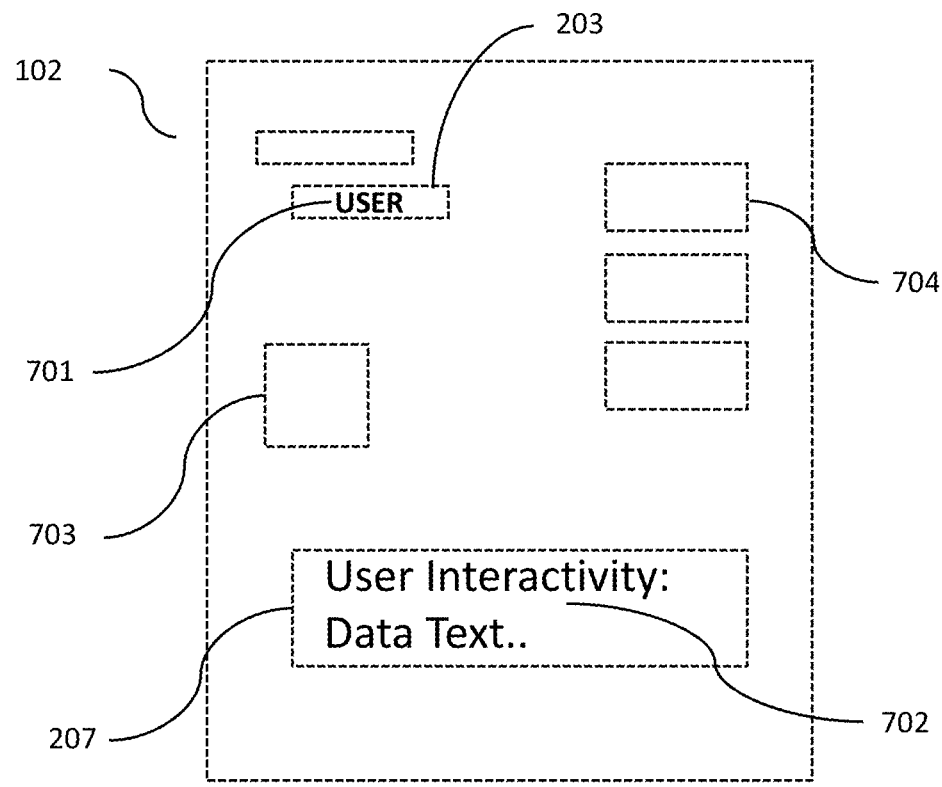
FIGS. 7A and 7B illustrate an example of interactivity between element areas and calculation of position and dimensions, according to an embodiment of the invention.

FIG. 7A illustrates an example of interactivities (including display properties) provided by the element areas to an embodiment of the invention. According to the embodiment, example element areas 203, 207 may be associated with element user interface interactivity functions. These areas allow interaction from a user device (for example, via input from a touchscreen, mouse click, etc.). These user interface interactivity functions may support a wide range of input, such as user text data entry 701, 702, which may uniquely be linked to the respective element area 203, 207. According to the embodiment element areas 703 and 704 could display different display colors to the user-device, and/or be associated with multiple states for each specific element.

Figure 7B:
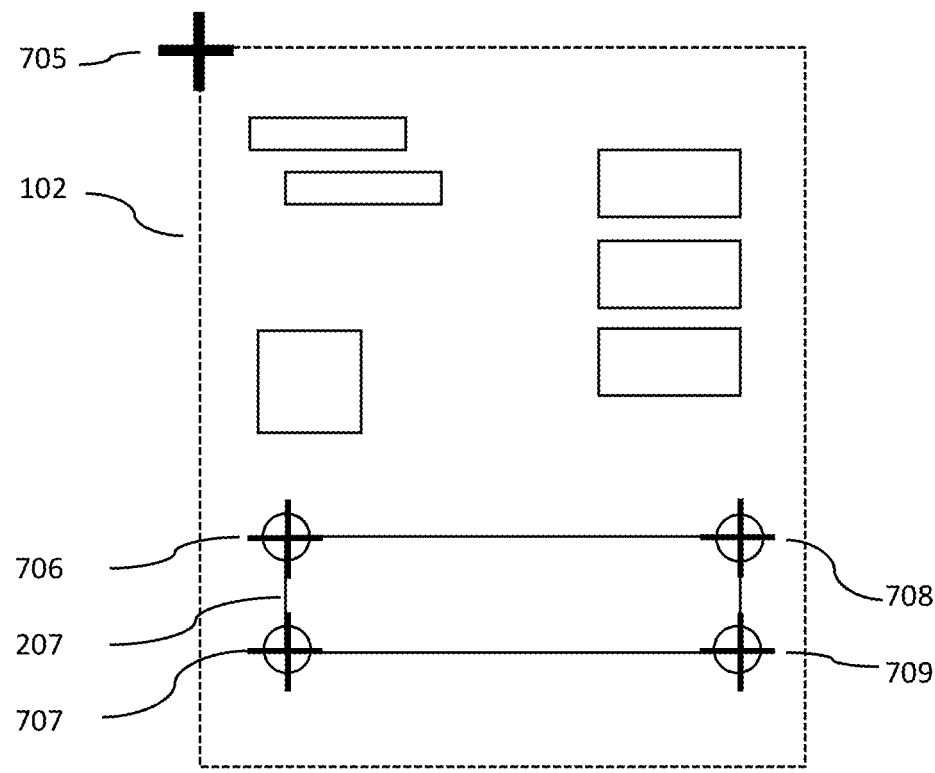

FIG. 7B illustrates an example of "element area definition positions" according to an embodiment of the invention. According to the embodiment, the element area 207 may have a number of "unique element area definition points" 706, 707, 708, 709 whereby each element definition point may have a unique x and y dimension co-ordinate value. The calculation of these values allows the creation of an interactive element area which can occupy this element area 207. The x and y dimension coordinates can then be used to calculate all the other previously referred dimensions: 401, 402 508, 510, which then allows the calculation of relative positional data for this element area 207 relative to the overall fixed-layout component area 201.

Figure 8:
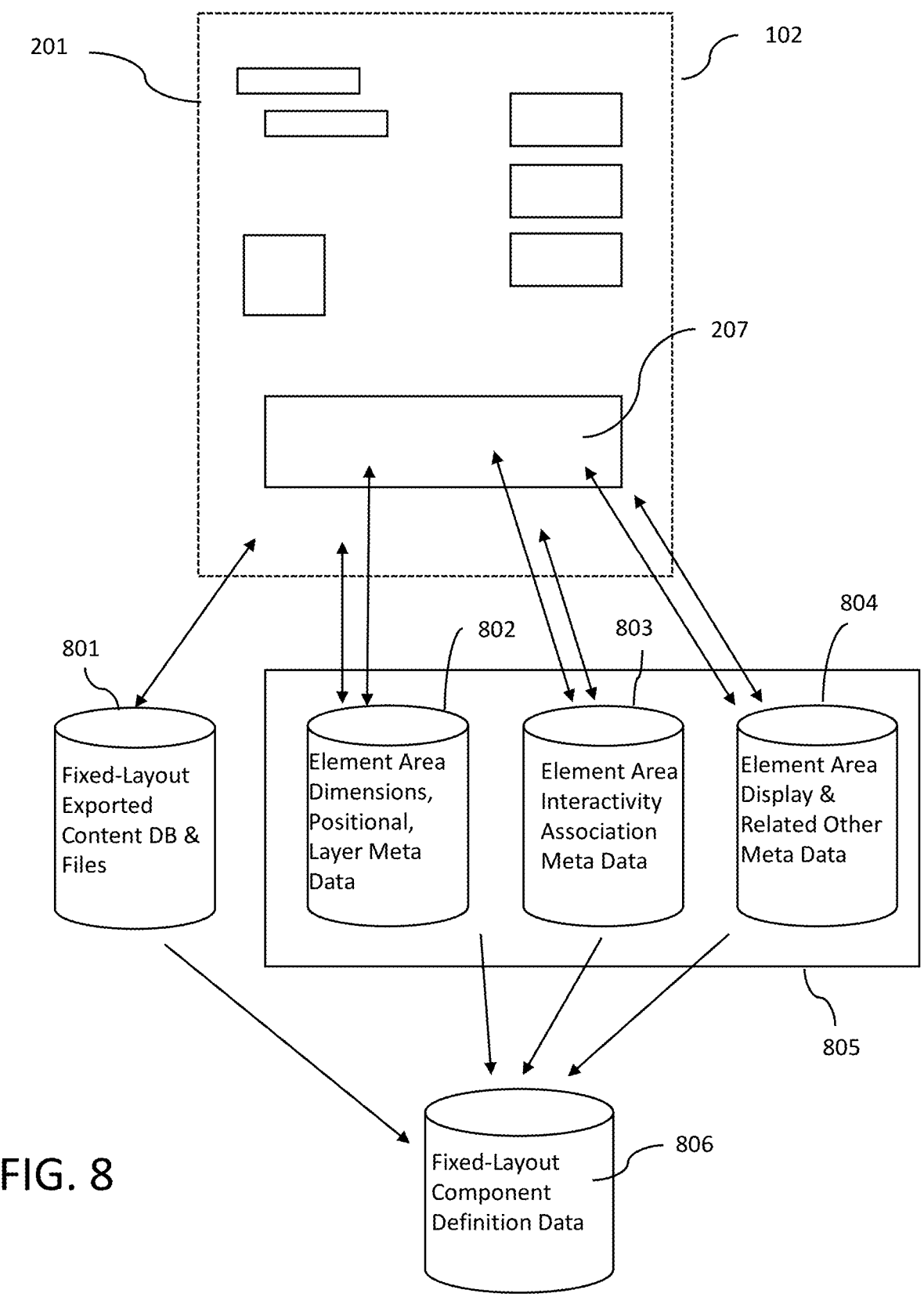
FIG. 8 illustrates an example of the various data stores associated with items as part of one or more fixed-layout area display components, according to an embodiment of the invention.

FIG. 8 illustrates an example of the various data stores (database, metadata, files, etc.) associated with one or more fixed-layout area display components, according to an embodiment of the invention. According to the embodiment, fixed-layout component 102, and with the overall area 201, may be understood to be a, "background," area of an overall component relative to the element areas 202, 203, 204, 205, 206, 207, 208 which may be visible in a, "foreground," in a relative sense. FIG. 8 further illustrates each fixed-layout component (all background and foreground areas) may have associated graphics, digital images, multimedia, or other data associations 801. FIG. 8 further illustrates all the dimensional, positional, calculated, relative, layer data, file, and metadata 802 and element user interactivities function association data 803 and other display, state, color and related associated data 804. All this data and associated metadata and files and any derived or further calculated data linking all these data items to the overall fixed-layout component, including the elements, are assembled, and stored in the component definition data store 806.

Figure 9:
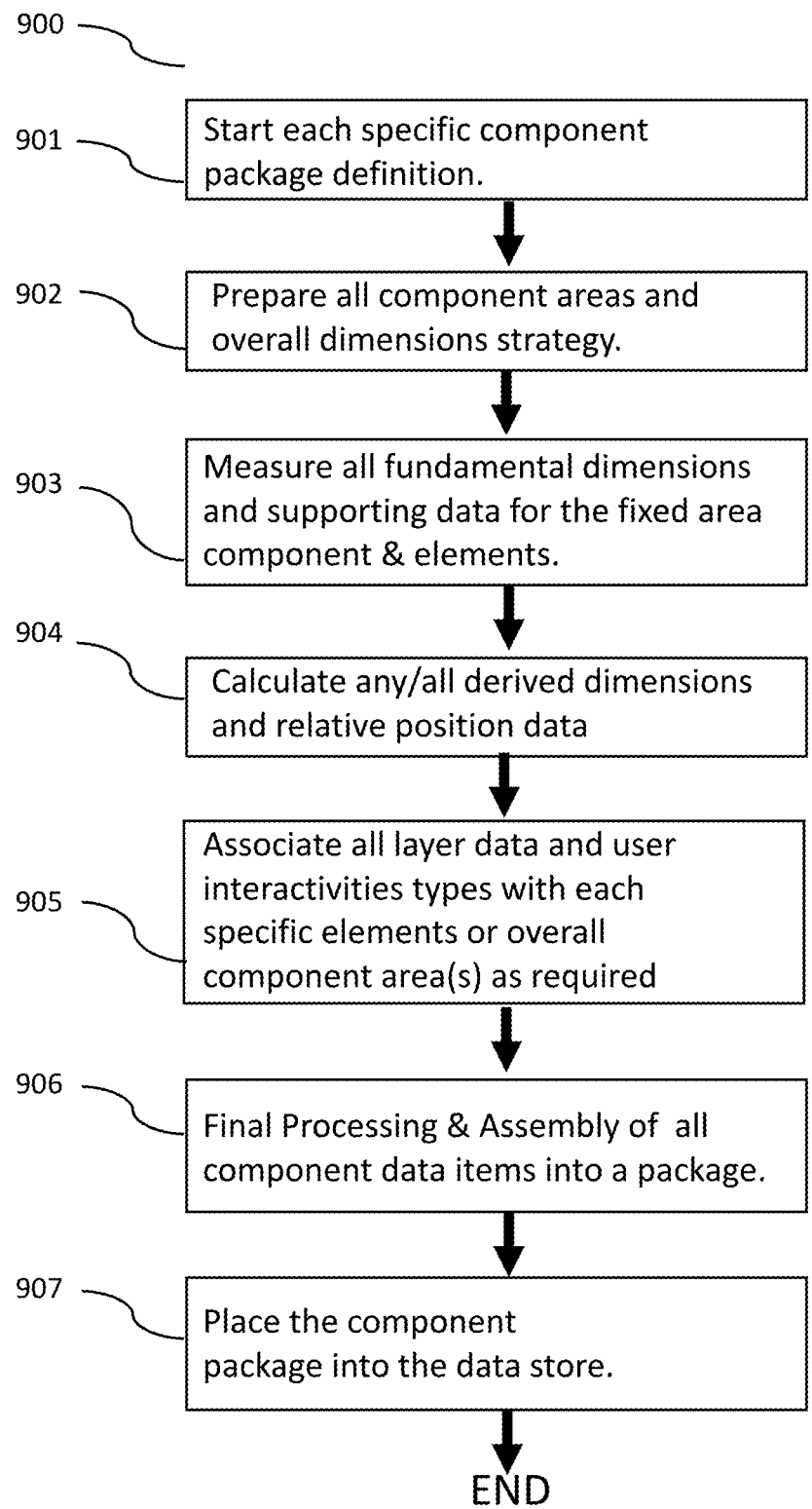
FIG. 9 is a high-level flow diagram illustrating an exemplary process for calculation of all dimension data for items which may be part of a fixed-layout component area, according to an embodiment of the invention.

FIG. 9 is a high-level flow diagram illustrating an exemplary process for calculation of all dimension data for items (e.g. element areas) which may be part of a fixed-layout component area, according to an embodiment of the invention. According to the embodiment, a fixed-layout component package preparation method is depicted. Accordingly, a user device may initiate component package definition process 901 by analyzing and preparing an overall component area and any associated graphics or digital image(s) for component background area 201, analyze a plurality of defined areas assigned to each associated element, and prepare any graphics or digital images associated with the element(s) 902 as part of the overall component. The primary dimensions 301, 302, 401, 402, 503, 505 for the overall area and each element(s) 202, 203, 204, 205, 206, 207, 208 are calculated in step 903. All of these primary dimensions may be processed further 904 resulting in derived calculated dimensions to support the requirement that all items in the overall fixed-layout component can support dynamically scaling and repositioning of the overall component size and associated elements so that accurate positional, size and display integrity is maintained. All the display-layer data (referring, for example, to the system of FIG. 2B) user interactivities types, different user states, and display colors, may be associated with each specific elements or overall component area(s) as required in step 905. All the dimension data (primary and calculated, derived) are then stored in the dimension's metadata data store 802. If elements have associated user interactivities 905 this data may be assembled and stored in the component package definition 803 data store. All of the relevant data items for the overall component may then be finally assembled 906 from the various data sources 801 802 803 804 and may be placed 907 in each component definition data store 806. The method step 901 may be repeated for all components which require the data definition.

Fixed Area Programmatic Display Window

FIGS. 10A and 10B illustrate an example of a fixed area programmatic display window which may be part of the overall user display window in a display screen, according to an embodiment of the invention. According to the embodiment, a programmatically generated window area 1001, with positional dimensions 1002 1004, and with area size dimensions 1003 and 1005 may be shown. The position and size of this display window will be controlled programmatically as part of an overall programmatic user interface application on the user device. The fixed-layout component 102 will be programmatically placed inside 106, 107, 108 the display window 1001 and resized dynamically to fit within this actual display window size, while also maintaining the aspect ratio of fixed area component 102, and all the elements contained within the fixed-layout package, and the relative size, position and display-layer data of all elements relative to each other as part of the overall component package. Further according to the embodiment, component 102 may be placed inside display window 1001 where the width of the component may be dynamically resized to equal the width of the display window 1001, and where there the depth of the component may be less than the display window resulting in an excess space area 1009. Further according to the embodiment, the aspect ratio of the programmatic display component 1001 may have the same aspect ratio as the fixed-area component area 201, which would enable the fixed-area component to exactly "fit into" this programmatic display window 1001. Display layer metadata may be used to ensure that all areas are shown to the user in the correct predefined sequence, and where some may overlap others ref FIG. 2B. The programmatic window 1001 may be resized and repositioned dynamically in FIG. 10C the updated window size and position 1010, driven by specific user interactivities with the overall programmatic application. The fixed-layout component 102 will then dynamically resize to fit new window area 1010, while also maintaining the aspect ratio of the fixed area component 102, and the elements contained therein, and that the relative size, position and display-layer data of elements relative to each other may be maintained as part of the overall fixed-layout component package.

FIG. 11 illustrates a plurality of exemplary fixed-layout windows and a component contained therein as it is repositioned and automatically resized in various device screens display sizes, according to an embodiment of the invention. According to the embodiment, user interface screen 101, 1101, 1103, 1105, 1107 of a plurality of user devices are depicted. Each user interface may comprise programming instructions stored in the memory, the programming instructions, when executed by the processor may display the overall application to the user. The fixed-layout content may display independently within the fixed area display window provided FIG. 11: 102, 1102, 1104, 1106, 1108, as part of each device display screen 101, 1101, 1103, 1105, 1107. The fixed-layout area can be re-sized, re-scaled and repositioned independently and dynamically depending on end user requirements and the overall programmatic screen display logic.

FIG. 12 illustrates various examples of user devices 1201, 1202, 1203, and each containing a programmatic display window 1204, 1205, 1206, and where the fixed-layout component may be automatically resized to fit each provided programmatic display window, while maintaining all positional, dimensional and aspect ratios within the fixed-layout component. According to the embodiment, the positioning of fixed-layout content display 102 in one specific (same) device 1201, then repositioned in the same device 1202 in the same specific orientation and with different device orientation detailed in 1203. As the device orientation may be changed from "Portrait" 1201 and 1202 to "Landscape" 1206 the fixed-layout component can be dynamically repositioned and resized as a unified component within a changing programmatic display window 1204, 1205, 1206.

FIG. 13 details an example of a client device 1300 with an online application installed 1301 and communicating over a network 1306 with a server application 1307. In this embodiment which details the example online user interface module(s) 1302 which may reside on the client device 1301. The online user interface module 1302 can be an integral part of the user interface modules 1308, and which may be a component of the overall server system 1307.

The user client device(s) 1300 may communicate directly or indirectly with the server 1307 and other systems via network(s) 1306. Device application 1301 user interface module 1302 may comprise programmatic component 1303 and fixed-layout display UI component 1304. Online device user-interface modules 1303, 1304 may be downloaded/synchronized automatically on use from the application server modules 1309, 1310. Programmatic client interface module 1303 may manage all aspects of the user display and for programmatic generated content and activities, and the creation, positioning, re-positioning and management of the fixed area display window 1001 (referring to FIG. 10A). Fixed-layout component module 1304 may manage aspects of the fixed-layout display components and any associated end-user generated data 1313. This module may access the specific component package(s) for the component(s) being displayed, it may then read the component definition data store 806 and then process all the contained data, render and display the package(s) within one or more fixed windows 1001 (referring to FIG. 10A) supplied by programmatic client interface module 1304 and present that to the end user on the device screen. If associated user data exists this will then be accessed from the user data store 1313 and also presented to the user.

While the client device 1300 and online application server system 1307 are presented with specific components, it should be understood by one skilled in the art, that the architectural configuration of the system 1300, 1307, 1312 may be simply one possible configuration and that other configurations with more (or less) components are also possible to achieve the desired result.

FIG. 14 details an example of a client or user device 1401 with an installed or "native" application (hereinafter referred to as "APP") 1402, and which communicates over networks 1410 with the Server Application 1307. The user client device(s) 1401 may communicate both directly and/or indirectly with the server 1307 and other systems 1408 via the network(s) 1410. The original installation of the "native" application on the device may be provided from application delivery server 1408. APP 1402 installation module or program 1409 may provide the application installation files from data store 1410, and this data store may also contain a version of component definition data 806 for the fixed-layout component definitions. When the initial installation has completed a copy of the component definition data 806 may then also reside with or inside APP 1402 on actual user device 1401. Component package APP data store 804 inside APP 1402 may also receive subsequent automatic or ad-hoc updates from a different or updated version of this data file which may be stored on the online application server system 1307 or the application delivery server 1408.

Installed APP 1402 and online client software 1301 may both exist separately and may be independent of each other on any specific same device 1300, 1401. APP 1402 user interface module may comprise its own programmatic component module 1404 and fixed-layout component module 1405. APP 1402 programmatic client interface module 1404 may manage aspects of the user display and for programmatic generated content and interactivities and the creation, positioning, re-positioning and management of fixed area display window 1001 (referring to FIG. 10A). The fixed component module 1405 may manage aspects of the fixed-layout display components and any associated end-user generated data 1407. This fixed-layout component module 1405 may access a specific version of the component definition data 806 inside or directly associated with APP 1402 for the component being displayed (within APP 1402). Fixed-layout module 1405 may then read from the component definition data store 806 and then process all the contained data, render, and display the fixed-layout package within the fixed display window 1001 supplied by programmatic client interface module 1404 and display that to the end user device. If user data 1407 which may be associated with APP 1402, the fixed-layout component module will also then retrieve and display APP data 1407 for the user via fixed-layout module 1405.

The user may interact with the fixed element areas 202, 203, 204, 205, 206, 207, 208 as part of specific component 201. Where these fixed element areas are configured to receive user-entered data 701 and 702, whereby this data may be saved to APP data store 1407 via the application logic modules 1406. If the user element data is already in data store 1407 (within the APP 1402, for example, from a previous save) it may be displayed/redisplayed to the associated user interface on completion and display of the fixed-layout component. Application (APP) user data store 1407 can update (as required) online application server system 1307 user data store 1313 via the server application programming interface (API) module 1311.

While client device 1300, 1401 and server systems 1307, 1408, are presented with specific components, it should be understood by one skilled in the art, that the architectural configuration of the system 1401, 1408, 1307 may be simply one possible configuration and that other configurations with more (or less) components are also possible to achieve the desired result.

FIG. 15 is a high-level flow diagram illustrating an exemplary process for programmatically loading and displaying a plurality of fixed-layout components, according to an embodiment of the invention. According to the embodiment, user device software (online 1301, or native/installed app 1402) software load and display process 1500: In some embodiments, the device display software 1302, 1403 may load programmatic module 1303, 1404 and may then complete initial initialization 1501 for a user device display. If a user device display comprises fixed-layout component 1502, programmatic device interface module 1303, 1404 may initialize 1503 viewing display window 1001 for the fixed-layout component. Fixed-layout component device interface module 1304, 1405 may then access the specific component 1504 from the component data store 804, where all the data may then be processed 1505 and the fully assembled/rendered fixed-layout package containing all its associated items may be then presented to the display window 1001 in step 1506, while dynamically resizing as required. If end-user data 1313, 1407 exists and is associated with the specific fixed-layout component being displayed, this data may be retrieved and displayed 1507 to the user by the modules 1304, 1405. Device application load and display process 1500 may be repeated from step 1502 for all fixed-layout components which may be part of the device screen (referring to FIG. 1B).

FIGS. 16A and 16B illustrate an exemplary embodiment of a fixed-layout component combined with programmatic display elements on a screen of a user device with a plurality of orientations, according to an embodiment of the invention. According to the embodiment, support for multiple orientations of landscape 1601 and portrait 1606 may be shown. The user device 1601, 1606, details the display 1602, 1607, whereby programmatic display area 1603, 1610 may be shown, and in contrast the fixed-layout area 1604, 1608 may be also shown. Further according to the embodiment programmatic text 1603, 1610 and fixed-layout component 1604 may be displayed. Programmatic text 1603 can be user selectable, whereas fixed component text 1604, 1608 may be non-selectable and may be contained, for example, on the fixed-layout area background digital graphic, and where the scaling may determine the text size of the fixed-layout component package within the window 1001 (referring to FIG. 10). An example of a user interactivity element is detailed in 1605, 1609, whereby its position and function are managed by the fixed component modules 1304, 1405 and may be independent of the overall programmatic application modules 1303, 1404. Display window 1001 size and position may be different across the device orientations 1601 and 1606 which may result in different size scaling of the fixed-layout component.

FIG. 18 illustrates an exemplary embodiment of a fixed-layout content component item 102 that comprises element areas 1801, 1802, 1803, 1804, 1813, 1815, 1817 that may be contained in/on fixed-layout content item 201, and that may form a basis for new element items 1808, 1809, 1807, 1814, 1816, 1818 (for example, as defined in FIG. 2A: 202, 203 . . . 208). Element area items 1808, 1809, 1807, 1814, 1816, 1818 may be automatically derived from highlighted areas 1801, 1802, 1803, 1804, 1813, 1815, 1817. Newly derived and calculated element areas 1807, 1808, 1809, 1810, 1814, 1816, 1818, are operable to support additional user interactivities.

FIG. 18 further illustrates an exemplary fixed-layout content item area 208 that may be defined as a "background" area 208 relative to any element areas 1801, 1802, 1803, 1804, 1813, 1815, 1817, that may be in a "foreground" on a relative basis (in some embodiments this may be seen as a layer). Further according to the embodiment, fixed-layout component 102 may comprise fixed-layout content item area 208, any number of digital graphics (for example, to makeup the full or partial area 208), items such as text, pictures, shapes, and four highlighted outline areas 1801, 1802, 1803, 1804, 1813, 1815, 1817 may be embedded as part of content item area 208. An overall objective, in a preferred embodiment, may be to automatically find and create element item areas (as defined in FIG. 2A: 202-208, etc.) which may be based on highlighted exemplary areas 1801, 1802, 1803, 1804, 1813, 1815, 1817. Further according to the embodiment, new element item areas 1807, 1808, 1809, 1810, 1814, 1816, 1818, may be dimensionally sized and positionally located such that the element item areas may reside just within these exemplary highlighted areas 1801, 1802, 1803, 1804, 1813, 1815, 1817. An objective is therefore to automatically identify a plurality of areas (that is, a plurality of "automatically found and calculated" areas) which may be inside each of areas 1801, 1802, 1803, 1804, 1813, 1815, 1817. These "automatically found" item areas comprising dimensional, positional, and display-layer data may then be each added as new "element items" to fixed-layout component definition data 806 (referring to FIG. 8).

Further according to the embodiment, a process is disclosed that may "automatically find" and calculate element item areas 1807, 1808, 1809, 1810, 1814, 1816, 1818, which are the dashed line figure area inside the highlighted area 1801, 1802, 1803, 1804, 1813, 1815, 1817, as illustrated. It should be noted that the "automatically found" element item areas illustrated 1807, 1808, 1809, 1810, 1814, 1816, 1818, (dashed line figure) may be marginally smaller than the highlighted area 1801, 1802, 1803, 1804, 1813, 1815, 1817 identified as part of the background image.

In other embodiments an "automatically found" area be can equal to or greater than (or much less than) highlighted areas 1807, 1808, 1809, 1810, 1814, 1816, 1818. "Automatically found" element definition points 706, 707, 708, 709 coordinates may then be used to further derive definition data required in the 802 dimension and positional data store which can then support a final assembly of fixed-layout component definition data 804. There may be many other alternative methods to determine element definition points 706, 707, 708, 709 coordinates to calculate width 401, height 402, and position of all element areas relative (as in FIG. 5: 508, 510) to the overall fixed-layout content item. "Automatically calculated" element item areas 1807, 1808, 1809, 1810, 1814, 1816, 1818 (dashed line figure) may be pre-defined as a percentage smaller than the boundary of the highlighted area 1801, or it may be a same size or also larger, depending on the requirement or configuration.

FIG. 19 is a high-level flow diagram illustrating an exemplary process for an automatic finding and calculation of element item areas and associated data for data stores, according to an embodiment of the invention. According to the embodiment, an example of process flow steps for "automatic finding and calculation" of element item areas and all associated data for component definition data 806 (referring to FIG. 8) is shown. Process 1900 starts at step 1901 to automatically find and calculate the fixed-layout element item areas and associated data and then to provide the data (and derived data) which may be required for dimensions and positional data store 802 and which may then be used in final fixed-layout package data store 806. An alternative may be for the user to manually calculate the necessary dimensional and positional data 806. The process is started 1901 by the initialization 1902 of a "search application" (which can be either an online application or a native/installed application) and where the overall fixed-layout component item 208 may be loaded and displayed to a user. The user can then select if a single element item area must be identified or if multiple adjacent areas 1801, 1802, 1803, 1804, 1813, 1815, 1817 in step 1903 are to be identified. The user may then commence a single element area search by selecting an "area specific" physical location, any point location 1805 inside the area 1801 via input received from a computer mouse pointer or finger touch control or other device input method. In area 1801, the search algorithm may then commence the search in many directions 1803, 1804, 1805, 1805 to determine calculations data necessary to support the new calculated area perimeter of 1807 (the dashed line figure). All the data and calculated/derived data for the specific area 1807 may be saved to the dimensions and position data store 802. If a search for a single area was initiated initially, then the search process may be completed. If a search for multiple adjacent areas was initiated (referring embodiment areas 1802, 1803, 1804 or 1813, 1815, 1817), then step 1907 continues processing at step 1905 where the search algorithm may move automatically onto the next associated adjacent area (in this embodiment 1803 and 1804, or 1815 and 1813, 1804, etc.) and identify all the required data where it may all be saved in the dimensions and positional data store 802. For multiple adjacent area search, the user may then commence the search by selecting an "area specific" physical location, any point location 1812 inside the area 1802 via input received from a computer mouse pointer or finger touch control or other device input method, and selecting the general search direction 1811 for the automatic search. The general search direction defines the general direction of a search (for adjacent cells), and can be in a specific direction from a start point; left, right 1822, up, down 1811, etc. A general search direction can also be set automatically so that all the possible directions (up 1824, down 1811, left 1823, right 1822) may checked automatically to identify all the adjacent cells in each specific cell direction.

In area 1802, the search algorithm may then commence the search within that area firstly (in the same way as outlined for area 1801 above) to determine calculations for that first element area, and then for the algorithm to progress in the defined direction 1811 to define element areas 1803 and 1804 in this illustrated embodiment. This iterative process 1908 for multiple element areas will continue until all adjacent areas are processed and the iterative process ends 1909 and all the data is processed and stored in the element area dimensions data store 802, which is then processed further to create the final fixed-layout component definition data 806.

Fixed-Layout Component Creation

FIG. 24 is a block diagram illustrating an exemplary system architecture 2400 for creating the fixed-layout component packages, according to a preferred embodiment of the invention. According to the embodiment, creation of fixed-layout components may comprise: fixed-layout content export parameters designator 2403 may designate a quality (for example, a level of image pixilation, image grain, and the like), resolution (for example, a high or low number of pixels), and file size (for example, kilobyte (kB)/megabyte (MB), etc.) of a fixed-content component, prior to the actual creation of fixed-layout components. User devices 2401a-n may receive, send, and set parameters associated to fixed-layout content via accessing export parameters designator 2403 via, for example, cloud network 2402 (or FIG. 22 network 31), prior to export manager 2404 importing, processing, and exporting fixed-layout content items (for example, a selection of fixed-content filed resident on storage device HDD 52 imported from the file system, and processed by system 2400). Fixed-layout content export manager 2404 may import source files(s) in a plurality of source formats known in the art (e.g. PDF, Microsoft™ Word documents, and the like) that may comprise a plurality of pages, and then analyze and export each fixed-layout content item (e.g. a fixed-content layout graphic such as PNG, JPEG, and the like). Accordingly, the fixed-layout content export process may result in one or more associated items (e.g. PNG, JPEG, and the like) for each page of the plurality of pages of the original source file. Interaction requests from one or more user devices 2401a-n may be received by export manager 2404 to: identify one or more input files (for example, PDFs); to process and start an automatic process of importing the input files (i.e. "the PDFs") and exporting the components (i.e. "the PNGs"). Content metadata manager 2405 may receive exported files from export manager 2404 and create associated additional metadata to the exported fixed-layout item.

Element finder 2406 may automatically find dimensions of a single shape area or a range of adjacent areas for areas embedded in the fixed-layout component item which has been exported via export manager 2404 (e.g. PNG, JPEG, etc.). Interaction requests may be received from one or more user devices 2401a-n by export manager 2404 to, for example, select a two-dimensional (2D) area for where element finder 2406 may commence a search for one or more shape areas. Element metadata manager 2407 may receive one or more 2D x-y coordinates data from element finder 2406 and perform calculations on this data (for example, as described in FIG. 5, FIG. 10, FIG. 18). Element creator 2408 may allow a creation of areas/shapes that may be an overlay displayed on top of the fixed-layout exported content component item. For example, as an additional layer of interactive components directly associated to the fixed-layout content with associated functions. File loader 2409 may upload exported files from a storage device (such as HDD 52), for example, upon receiving a request and location from a user device 2401a-n, and place them into system 2400 for further processing by client metadata module 2405. File viewer 2410 operates as a mechanism to view files, as is known in the art. All fixed-layout exported content which is generated by the export manager 2404 and the content metadata manger 2404 may be saved to the fixed-layout exported content and metadata data store 801. All fixed layout element definition data (metadata, calculated, etc.) may be saved to the element all data store 805

In some embodiments, at least system components 2403 . . . 2410 may reside and execute completely on a user device 2401a in one complete system.

FIG. 25 is an exemplary process for creation of an exported fixed-layout content item, database, and files 801. According to an embodiment, a graphic file/image (e.g. PNG, JPEG, etc.) may be exported from a source file (for example, a PDF file). According to the embodiment, for n pages in the source file, the export may provide n number of graphic/files (e.g. PNG files) export files. In some embodiments, any number of graphic/files may be exported for a single PDF page such that these graphics can be re-assembled dynamically (or using tiling techniques, or similar methods)) into one overall seamless graphic presented to a display of, for example, user device 2401a, such that an end user may not be aware that the graphic presented may be a range of smaller files dynamically presented together to give a seamless and unified view of the original PDF page. Accordingly, a request to commence process 2501 may be received from, for example, user-device 2401a.

Accordingly, in step 2503, a request from user-devices 2401a-n may be received, at files viewer module 2410, to organize at least a portion of one or more fixed-layout content source files 2502 into a fixed-layout batch source content location 2504 and non-batch 2508 source content files. A "batch" of fixed-source content files may refer to a grouping of files in a location in a file management system such that the grouping of files may be loaded as a group or "batch" and where the grouping may be processed automatically, for example, one by one, until all files in the "batch" are processed. Examples of "batch" content file types may include, but not limited to, Adobe™ PDF files, Microsoft™ Word DOCX (DOC and other variants) and image types, such as, PNG, JPEG, TIFF, and the like. Examples of "non-batch" content files may include, but not limited to, Adobe™ Photoshop™ (PSD), Adobe™ InDesign™ (IDD), CorelDraw™ (CDR), and the like.

In a next step 2505, export parameters designator 2403 may configure system 2400 to define required parameters on content export (for example, at least quality, resolution, color, and other parameters as described earlier). Export parameters designator 2403 may receive one or more requests from, for example, user devices 2401a relating to parameters which needs to be set, such as, viewing quality (e.g. sharp or grainy ("pixelated") text on a graphic, which may be a function of pixel resolution and other parameters) of the fixed-layout component, which in turn may relate to dimensions and resolution (pixels size width by height) of the exported content component. The quality parameters may result in varying file sizes (kB, MB, etc.) of the files that are exported. Once step 2505 is complete, an automatic content export processing step 2506 may be initiated by, for example, a request from user device 2401a. Accordingly, content export manager 2404 may receive a request from one or more user devices 2401a-n to load one or more source file from the fixed-layout source content files 2504. Content export manager 2404 may then create a new file (typically for each page of the source input file; however, in some embodiments, there may be more than image, as discussed previously). In a next step 2506 additional metadata 801 may be created and associated to files created from the automatic content export processing. An example of metadata may be a syntax text file which may comprise a definition of how individual "pages" are grouped or referred to each other to re-create/represent the original source PDF file. Other metadata may also be added (for example, metadata associated to project details, project ID, or other descriptive information describing, linking, sequencing, or other aspects of images and pages). For example, if an original PDF had, for example, ten pages, an associated metadata file may define which exported files may make-up the original PDF pages and arrange them in a correct original sequence. In a next step 2507, content metadata processing may commence whereby content metadata manager 2405 may create and save any associated metadata files/data with the exported fixed-layout content files (e.g. images) to the fixed-layout exported content and metadata data store 805.

In some embodiments, for "non-batch" files 2508, other programs (e.g. Adobe™ Photoshop™, CorelDraw™, etc.) may be used to provide a supervised export at step 2509 via semi-automatic or manual content export processing of fixed-image layout content files to a desired quality. File loader 2409, on receipt of a request from user device 2401a, may upload exported files stored on a storage device (for example, to HDD 52), for further processing by client metadata manager 2405, to, for example, generate additional metadata at step 2507 (as described above). Accordingly, fixed-layout exported content and metadata 801 may be further updated.

FIG. 26 is an exemplary process 2600 for the creation of elements area items associated with the fixed-layout exported content item. The process starts at step 2602 by presenting, on a display screen of a user device, a fixed-layout content file so that element items may be associated with the fixed-layout content item (for example, by receiving requests from user device 2401a. The element finder 2406 may display to user device 2401a, based on a request from user device 2401a, a full content item (single file or dynamically re-assembled files). The element metadata manager 2407 may receive, from user device 2401a, a range of configurations relating to how one or more new elements may be configured. In a next step, 2603, a plurality of parameters may be defined to determine how the one or more element items may be presented to a user interface of a display of, for example, user device 2401a, and how interaction from user device 2401a may behave with respect to the one or more element items. Further, various states associated to elements describing behavior of the element item, may be determined within an overall application system. Element area item configuration properties, that may be stored as metadata, of the one or more elements items, may be: (a) the type of area that is being searched for (e.g. a rectangle of any size); (b) defining one or more display color(s) of the element area for various states; (c) if the element area allows data entry (e.g. from a user device selecting within an element area of the one or more element areas), and type: select a format e.g. numeric, alphanumeric, or some other predefined data format; (d) the element area may have additional properties such as: mandatory or non-mandatory data-entry for an associated element area where data must be entered (or not), by, for example, a user device of user devices 2401a-n for various states; (e) a pre-configured display of other items within an element area: such as a string of text, and other related parameters; (f) set display layer association; (g) associating a unique element area reference number; (h) linking element-areas logically such that if data is entered in a specific element-area, the next logical associated element-area is then allowed to accept data entry (or not); (i) any number of other behaviors determining function for a user interface or user device display.

The type of element-area being searched (e.g. a rectangle), may be used by the element finder 2406 to determine a number of and specific element-area internal search directions (for example, from the search point 1805) that element finder 2406 may use in the search area process. Examples of internal search directions for rectangles are illustrated in FIG. 18, 1803, 1804, 1805 1806 according to one embodiment of the invention. Areas of different shapes may require a different number of internal search directions to ensure that boundaries of an element area is identified.

In a next step 2604, a select search start position process for finding the element area item begins. The element finder 2406 may receive an input, for example, from a user input device 49 or 50 (for example, a user pointing device, keyboard, touch screen device) associated to user devices 2401a that initiates a search process to start. An x-y 2D coordinate position of a location associated to the location received from user interaction, for example, via input device 50, may be provided to the element finder 2406, and must be inside an associated border of the element area that may need to be identified, and which may be part of the fixed-layout content item.

In a next step 2605, a find element x-y coordinates begins in order to determine the element's x-y coordinates for each element definition point (for example, as described in FIG. 7: 706, 707, 708, 709) on the selected element area (e.g. in a square or a rectangle element area, there are four primary definition positions, or corners, by which the area can be re-created). Element finder 2406 may receive, from user device 2401a, coordinates for an x-y start value from which to commence the area search. The element finder 2406 may continue processing automatically until it has identified all the x-y coordinate values for all the primary definition points. referring again to FIG. 18, in an embodiment, outline area 1801 may be contained in overall fixed-layout area 201, whereby a new element area to identify may be outline 1807, and whereby element finder 2406 may be prioritizing computations to firstly identify the x-y position of element definition points 706, 707, 708, 709.

In a next step, 2606, a calculation for element dimensions data may begin by calculating dimensions data from x-y coordinate data calculated in step 2605. The element creator 2408 may receive x-y coordinate values from element finder 2406 to calculate an additional set of data values that may include element area width and height and an actual position of the element area with respect to the overall fixed-layout content item. Referring again to FIG. 4, the embodiment may comprise a calculation for width 401 and height 402. Referring again to FIG. 5, the embodiment may comprise reference point 509 in the element area with respect to fixed-layout area reference point 501. Accordingly, reference points 501 and 509 may then allow actual dimensions of an absolute x position 510, and y position 508 of the selected element area. With element area x position 510 and y position 508, and fixed-layout content item x position 514 (similarly, 301), and y position 515 (similarly, 302), and width 401, and height 402; accordingly, these dimensions may then be used to calculate derived values of fractions (or percentages when multiplied by 100). Accordingly, all x direction dimensions may be divided by overall x dimension 301 (or 514) to result in a decimal fraction, similarly for x direction dimensions 302 (or 515) to arrive at a decimal fraction.

In a next step 2609, positional, dimensional, derived/fractional (including calculated values) data for items may be saved to element all data store 805. Element creator 2408 may saves x-y coordinates, calculated and derived fraction data, and resultant data from the element area properties step 2603. The element creator 2408 may save associated data to the element to data store 805. On completion of step 2609, element finder 2406 may begin process 2600 at step 2604 for another selection of a search start position to find another single element area request. In some embodiments, for a different element type, processing may begin again at step 2603.

In some embodiments, if element finder 2604 receives a request, from, for example, user device 2401*a*, to find a range of adjacent cells (that is, a plurality of adjacent areas of a fixed-layout content for which element areas are desired) in, for example, an external search direction 1811 (referring to FIG. 18). Once complete, element finder 2406 may begin again at step 2608 to automatically find a next element area. Accordingly, steps 2605, 2606 and 2609 and 2608 may be repeated until, for example, element finder 2406 may be unable find any additional adjacent element areas. Referring again to FIG. 18, according to the embodiment, if a find element area 1812, for example, as selected by user device 2401*a*, with a goal to find element areas within find area 1808, element finder 2406 may then iterate automatically to find the next area 1809 and 1810 automatically, and from the outlined areas 1802, 1803, 1804 contained in fixed-layout content item 201. Referring again to FIG. 18, search direction 1822 illustrates a different search direction, where a selection 1820 (for example, as selected by user device 2401*a*) may initiate a search, by element finder 2406, to iteratively identify element area 1818, 1816, and 1814.

FIG. 27 is an exemplary process 2700 for a search for x-y coordinates for an element area item. In a first step 2701, element finder 2406 may receive coordinates, from a user device 2401*a*, associated to an area inside an element area, element finder may then store the x-y coordinates values as start position coordinates xS-yS. In a next step 2702, element finder 2406 may then detect an associated pixel color at the xS-yS location and store, in database 806, the color data as a "start pixel color". In a next step 2703, element finder 2406 may set an internal search direction associated to the element area type which has been previously selected in step 2603. Examples of internal search direction are illustrated in FIG. 18, referring to 1803, 1804, 1805 1860 from a starting position of 1805 according to one embodiment of the invention. It should be noted that areas of different shapes may require a different number of directions to ensure that boundaries of the element area are identified.

Referring again to FIG. 18, examples of xS-yS are illustrated at 1805, 1812, 1820. Referring again to FIG. 27, in a next step 2704, element finder 2406 may find coordinates for a next adjacent pixel and analyze a pixel color at adjacent pixel location. Accordingly, if a first internal search direction is a +x direction 1804, then the next pixel coordinates color search may be at x-y coordinates equal to x(S+1)-yS coordinate position. If the first internal search direction was in the −x direction, for example direction 1805, then the next pixel color check may be at coordinates x(S−1)-yS. Further at step 2704, element finder 2406 may calculate a next x(S+1)-yS coordinates for search direction 1804, element finder 2406 may then reads a "current search pixel color" at this x(S+1)-yS coordinates location. In a next step 2705, element finder 2406 may compare the current search pixel color to the reference "start pixel color" and if these two values are the same, then iteration step 2706 is complete. Accordingly, element finder 2406 may be reset to continue at step 2704 to execute a next find next pixel coordinate. It should be noted that element finder 2406 may continue process iteration 2704, 2705, and 2704 until a "current search pixel color" is not the same as the "start pixel color" thereby concluding the specific search direction (referring to set internal search direction at step 2703). Referring again to FIG. 18, a search direction and distance 1804 may be concluded, thereby defining an x co-ordinate value for a position for element definition positions 708 and 709. In some embodiments, if element finder 2406 sets the next search direction to be −x (referring to direction 1805), then an x coordinate value for element definition positions 706 and 707 may be next identified by element finder 2406. And following those two directions, element finder 2406 may set a next direction as +y (referring to direction 1806), then identifying ay coordinate value for position 706, 708, and may then set, by element finder 2406, a final search direction which may be −y direction (referring to direction 1806), then the −y coordinate value, for element definition positions 707 and 709, may be identified. In an iteration step 2707, element finder 2406 may process at least a portion of all defined search directions until all the internal search directions are fully completed. On completion of all required directions, by element finder 2406, x-y values for element definition positions 706, 707, 708, 709 may be now identified for the element area, accordingly, element finder 2406 may calculate element area data points in process step 2606 to calculate element dimensions data (referring to FIG. 26).

FIG. 28 is a block diagram illustrating an exemplary system architecture 2800 for integrating fixed-layout components with external applications according to a preferred embodiment of the invention. According to the embodiment, programmatic user interface 2803 may be an application (for example, workflow and interaction management systems such as SAP™, Siebel™, Oracle™, Genesys™, Cisco Call Manager™, other CRM systems, other custom build interaction, customer, and/or workflow management systems) that provides general application functionality and which may be displayed on a display screen of a user device 2801*a-n*. Programmatic user interface 2803 may receive a request (for example, via an application programming interface, via a user interface, etc.) from a user device 2801*a-n* to present and display an application to a user device display screen. Programmatic user interface module 2803 may be any application which has been developed using standard programming techniques where an application developer writes application code which may be then compiled/completed and presents the application logic and display to an end user device. In some embodiments programmatic user interface 2803 may be part of a server based system, for example an SaaS system, as is known in the art, and the like, whereby a graphical presentation to a user device 2801*a-n* has been generated programmatically.

Programmatic user interface 2803 may include the functionality to issue a request from anywhere within its application, to fixed-layout UI 2804. Fixed-layout UI 2804 may then issue a request to fixed-layout processor 2805 to retrieve a fixed-layout component data from the fixed-layout component definition data. On receipt of the fixed-layout component data, by the fixed-layout processor 2805, which in turn may present data to fixed-layout UI 2804, and which may present on user-devices 2801*a-n*. The fixed-layout UI 2804 may then present the component to an associated device display such that the fixed-layout component may be resized dynamically to fit within the display area (referring to example FIG. 10A: 1001).

Referring again to FIG. 1A, an overall display screen area 101 may have a programmatic area 103 and one fixed-layout display component area 102, as illustrated. Referring again to FIG. 1B, an overall display screen area 105, programmatic application area 110, and fixed-layout display component areas 106, 107, 108, 109 is illustrated. In Referring again to FIG. 10A, programmatic area 103 may provide an area/window embedded into a main programmatic application view with specified programmed dimensions of width 1005 and height 1003, and with position 1004 and 1002 relative to the overall display area 101 boundary. Referring again to FIG. 10B, the fixed-layout content component definition configuration data 806 may be loaded into the fixed-layout area/window outline area 1001.

Fixed-layout UI 2804 may issue a request to fixed-layout processor 2805 to retrieve the fixed-layout component definition data 806 from the data store, and present this to fixed-layout UI 2804 which may then processes and display component definition data 806 on a display screen, of user device 2801*a-n*, in area/window 1001. Fixed-layout UI 2804 may read and process all definition data 806 for a specific fixed-layout component which may then enables the specific fixed-layout component to be reassembled from the component parts of; fixed-layout content item 201, element areas defined 202, 203, 204, 205, 206, 207, 208, calculated fractional dimensions of each element 401, 402, their position 508, 510 relative to the fixed-layout area, and user interactivity functionality definitions 802, 803, 806 (that is, all part of 806).

Further, fixed-layout UI 2804 may issue a request to fixed-layout processor 2805 to retrieve a specific set of fixed-content user data 1313 depending on a requirement of the overall programmatic UI 2803. Fixed-layout component configuration data 806 may comprise unique metadata identifiers such that fixed-content user data 1313 may directly associated with each specific component in 806. In some embodiments, fixed-layout content component area, and all the element areas, may have associated and unique metadata identifiers/references. References associated to elements, components (for example, component IDs, element IDs, and related other data defined in metadata) may then be used by fixed-layout processor 2805 to search for and retrieve specific fixed-content user data 1313 for element items contained within the fixed-layout component definition 806, and which may be part of a specific component definition. Fixed-layout processor 2805 may transmit retrieved user data 1313 to the fixed-layout UI 2804 for presentation to a display area of, for example, user device 2801*a*. The fixed layout UI 2804 may receive any number of user interactions from user device 2401*a*. This fixed-layout UI 2804 may communicate with the fixed-layout processor 2805 to determine a response to the user device, and to also save (or compute any additional data) any additional user (generated or calculated) data to the fixed-content user data store 1313 which may result from these general interactions.

It should be noted that programmatic UI 2803 presentation on a user device 2801*a-n* may vary significantly in terms of a form factor and orientation of the user device (referring to FIG. 11: 101, 1101, 1103, 1105). Area/window 1001 for each of these examples may have different dimensions and positional location within the associated device screen (referring to FIG. 11: 102, 1102, 1104, 1105, 1108). Fixed-layout UI 2804 may then display component definition 806, and associated user data 1313 inside these areas (referring to FIG. 11: 102, 1202, 1104, 1105, 1108) such that a re-assembly and presentation to the user device may be positionally and proportionally exact (as illustrated in FIG. 10B: 1001, FIG. 10C: 1009, FIG. 11: 1102, 1104, 1106, 1108).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

FIG. 17A illustrates an example of a conventional system bus computing architecture system 1700, and where the components are in electrical communication with each other using a bus 1707. The exemplary system 1700 includes a processor unit 1708 and the system bus 1707 that connects the various items: memory 1701, RAM 1702, ROM 1703 to the processor 1708. The system processor 1708 may be supported by cache 1709 performant memory, or be integrated as part of the processor 1708. The system 1700 can copy data from the memory 1701 and/or the storage device 1710 to the cache 1709 for rapid access by the processor 1708. Cache can provide performance, rather than having the processor 1708 waiting for data. These and other modules may control or be configured to control the processor 1708 to perform certain actions, and which may require the use of memory 1701. The memory may consist of many different types and performance characteristics. The processor 1708 may include a general-purpose component, or hardware or software modules, such as modules 1711, 1712, stored in the storage device 1710, and configured to control the processor 1708 as well as any special purpose processor where software instructions are incorporated into the actual processor design. The processor 1708 may be a self-contained computing containing multiple processors or cores, bus, memory controller, and cache etc. The user interaction 1704 with the device may be any number of mechanisms, such as keyboard, mouse, a touch-sensitive screen for gesture or graphical input or other. The output-device 1705 can be display screen. The communications interface 1706 can typically govern and manage the user input and system output. There is no restriction on operating on any particular hardware arrangement and therefore the basic features here may easily be substituted for improved hardware or firmware as they are developed. The storage device 1710 is non-volatile memory can be a hard disk or other types of nontransitory computer readable media which can store data that is accessible by a computing device, such as solid-state memory device, flash memory, read only memory 1703 ROM.

FIG. 17B illustrates an example computer system 1715 which has a chipset architecture that could be used to execute the described system and methods and managing the graphical user interfaces on the devices. This computer system 1715 is an example of computer hardware, software and firmware that can be used to implement the disclosed technology. The system 1715 can include a processor 1717 representing any number of physically and/or logically distinct resources capable of executing software, firmware and hardware configured to perform identified logic computations. The processor 1717 can communicate with a chipset 1716 which in turn can control inputs to/from the processor 1717, outputs to the output device 1721 and can read/write information to the storage device 1719 which can include any number of media types including for example solid state media. Chipset 1717 can also read/write to the RAM 1718 module. A chipset processor 1717 can output information to outputs 1721 such as a device display, and can read/write information to a storage device 1719, which can include may media types, including solid state media. Chipset 1717 can also read/write data to RAM 1718. Chipset can interface directly or indirectly with the output device 1721, and which could include a keyboard, a pointing device such as a mouse, or a touch-sensitive screen for gesture or graphical input. Inputs to the system 1715 can come from a variety of sources, human interface devices and/or machine generated. Chipset 1717 can interface with one or more communications interfaces 1720 that can have different physical interfaces. Such communications interfaces can include interface for wired and wireless local or wide area networks. Some applications of the methods for generating, displaying, and using a GUI (graphical user interface) disclosed herein can include receiving ordered information data over the physical interface or be generated by the processor 1717 by analyzing data in the data storage 1719.

It can be appreciated that exemplary systems 1700, 1715 can have more than one processor or be part of a group or cluster of computing devices networked together to provide greater computing capability. For clarity of explanation in some instances the present technology may be presented as including individual functional blocks comprising devices, device components, steps or routines in a method embodies in software, or combinations of hardware and software.

Methods according to the above described examples can be implemented using computer-executable instructions that are stored or otherwise available from computer readable media. Such instructions can comprise for example, instructions and data which cause or otherwise configure a general-purpose computer, special purpose computer or special purpose processing device to perform a certain function or group of functions. Portions of computer resource used can be available over a communications network. The computer executable instructions may be, for example binaries, other intermediate format instructions such as assembly language, firmware or source code. Examples of computer-readable media that may be used to store instructions, information used, and/or information created during methods according to described examples include flash memory, USB devices comprising non-volatile memory, networked storage devices etc.

Devices implementing methods according to those disclosures can comprise hardware, firmware, and/or software can take a variety of form factors. Form factor examples can include laptops, smart phones, personal digital assistants, small factor personal computers etc. Functionality described herein can also be embodied in peripherals. Such functionality can also be implemented on a circuit board among different chips or different processes executing in a single device etc.

A variety of examples and other information was used to explain aspects within the scope of the disclosed methods, no limitations should be implied based on particular features or arrangements in such examples, as one of ordinary skill would be able to use these examples to derive a wide variety for implementations.

Referring now to FIG. 20, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 20 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 may handle communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files comprising higher level code that may be executed by the computer using an interpreter (for example, scripts written in Python, Perl, Ruby, Groovy, or any other scripting language).

In some embodiments, systems may be implemented on a standalone computing system. Referring now to FIG. 21, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 20). Examples of storage devices 26 include flash memory, magnetic hard drive, CD-ROM, and/or the like.

In some embodiments, systems may be implemented on a distributed computing network, such as one having any number of clients and/or servers. Referring now to FIG. 22, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 21. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

FIG. 23 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

What is claimed is:

1. A system for intelligent layering of interactive programmatic elements for fixed content, comprising:
an intelligent layering computer comprising at least a processor, a memory, and a plurality of programming instructions stored in the memory and operating on the processor, the programming instructions, when executed by the processor, cause the processor to establish a search start position based on an initial set of coordinates;
determine a search pattern, the search pattern comprising a plurality of search directions based on a shape designation, the search pattern starting at the search start position;
find boundaries of one or more element areas, using the search pattern, the boundaries determined by a change in pixel color;
assign a plurality of behaviors for the one or more element areas;
create a fixed-layout package comprising the boundaries, the one or more element areas, and the plurality of behaviors as one or more layers.

2. The system of claim 1, wherein to find the boundaries, the plurality of programming instructions when executed by the processor further cause the processor to:
set a current search direction based on a first search direction of the plurality of search directions;
initialize a pixel position as the search start position;
iteratively analyze a pixel color at the pixel position;
move to an adjacent pixel along the current search direction
set the pixel position to the position of the adjacent pixel
record a boundary of a plurality of boundaries, the boundary based on a location associated to the current pixel;
set the current search direction to a next search direction of the plurality of search directions; and,
repeat analyzation of pixels until all search directions, of the plurality of search directions, have been completed.

3. The system of claim 1, wherein the one or more layers comprise a plurality of display-layer identifier data, the display-layer identifier data used to determine a sequence of the areas for display within the component.

4. The system of claim 3, wherein the display-layer identifier data determines one or more areas that are visible on an interface display of a second user device.

5. The system of claim 4, wherein at least a portion of the one or more element areas are interactive and operable to receive interactivity from the second user device.

6. The system of claim 5, wherein a plurality of metadata is associated to the one or more element areas, at least a portion of the plurality of metadata defining a corresponding behavior.

7. The system of claim 6, wherein a first behavior is interactivity to an external service.

8. The system of claim 1, wherein, a first element area is a percentage of a size of an associated boundary.

9. A computer-implemented method for intelligent layering of interactive programmatic elements for fixed content, comprising
the steps of:
establishing a search start position, the search start position based on an initial set of coordinates;
determining, by an element finder, a search pattern, the search pattern beginning at the search start position and comprising a plurality of search directions based on the shape designation;
finding, by the element finder, boundaries of an element area, using the search pattern, the boundaries determined by a change in pixel color;
assigning, by an element metadata manager, a plurality of behaviors for the element area;
creating, at the export manager, a fixed-layout package comprising the boundaries, the element area, and the plurality of behaviors as one or more layers.

10. The method of claim 9, wherein finding the boundaries comprises the steps of:
(a) setting a current search direction based on a first search direction of the plurality of search directions;
(b) initializing a pixel position as the search start position;
(c) analyzing a pixel color at the pixel position;
(d) moving to an adjacent pixel along the current search direction
(e) setting the pixel position to the position of the adjacent pixel
(f) if the color of the current pixel is the same as the pixel color, repeat at step (c);
(g) recording a boundary of a plurality of boundaries, the boundary based on a location associated to the current pixel;
(h) setting the current search direction to a next search direction of the plurality of search directions;
(i) repeating at step (b) until all search directions, of the plurality of search directions, have been completed.

11. The method of claim 9, wherein the one or more layers comprise a plurality of display-layer identifier data, the display-layer identifier data used to determine a sequence of the areas for display within the component.

12. The method of claim 11, wherein the display-layer identifier data determines one or more areas that are visible on an interface display of the user device.

13. The method of claim 9, wherein at least a portion of the one or more element areas are interactive and operable to receive interactivity from the second user device.

14. The method of claim 13, wherein a plurality of metadata is associated to the one or more element areas, at least a portion of the plurality of metadata defining a corresponding behavior.

15. The method of claim 14, wherein a first behavior is interactivity to an external service.

16. The system of claim 9, wherein, a first element area is a percentage of a size of an associated boundary.

* * * * *